(12) United States Patent
Dancer et al.

(10) Patent No.: US 8,793,491 B2
(45) Date of Patent: Jul. 29, 2014

(54) ELECTRONIC DATA COMMUNICATION SYSTEM

(75) Inventors: Andrew Dancer, Banbury (GB); Mark Chimley, Gloucestershire (GB); Adam Tuaima, Somerset (GB); Matthew Baldwin, Carmarthenshire (GB)

(73) Assignee: Trend Micro Incorporated, Tokyo (JP)

( * ) Notice: Subject to any disclaimer, the term of this patent is extended or adjusted under 35 U.S.C. 154(b) by 1655 days.

(21) Appl. No.: 12/294,819

(22) PCT Filed: Mar. 22, 2007

(86) PCT No.: PCT/GB2007/001047
§ 371 (c)(1),
(2), (4) Date: May 24, 2010

(87) PCT Pub. No.: WO2007/110598
PCT Pub. Date: Oct. 4, 2007

(65) Prior Publication Data
US 2010/0228973 A1    Sep. 9, 2010

(30) Foreign Application Priority Data

Mar. 28, 2006 (GB) .................................. 0606186.5

(51) Int. Cl.
*H04L 29/06* (2006.01)
*H04L 9/08* (2006.01)

(52) U.S. Cl.
CPC .................................. *H04L 63/065* (2013.01); *H04L 9/0833* (2013.01)
USPC ............................ 713/168; 380/277; 380/282

(58) Field of Classification Search
CPC .... H04L 63/065; H04L 9/0833; H04L 63/062
USPC ...................... 713/153, 168; 726/12; 380/286, 380/277–282
See application file for complete search history.

(56) References Cited

U.S. PATENT DOCUMENTS

| | | | |
|---|---|---|---|
| 6,073,242 A | 6/2000 | Hardy et al. | |
| 6,721,424 B1 | 4/2004 | Radatti | |
| 6,978,367 B1 | 12/2005 | Hind et al. | |
| 7,162,738 B2 | 1/2007 | Dickinson et al. | |
| 2002/0059529 A1* | 5/2002 | Beton et al. | 713/201 |
| 2003/0161335 A1* | 8/2003 | Fransdonk | 370/401 |
| 2005/0144439 A1 | 6/2005 | Park et al. | |
| 2005/0198170 A1* | 9/2005 | LeMay et al. | 709/206 |
| 2007/0055731 A1* | 3/2007 | Thibeault | 709/204 |

FOREIGN PATENT DOCUMENTS

| | | |
|---|---|---|
| GB | 2368756 | 2/2000 |
| WO | 0075754 | 12/2000 |

OTHER PUBLICATIONS

International Search Report, Jul. 19, 2007.
United Kingdom Patent Office Search Report, Jun. 21, 2006.

* cited by examiner

*Primary Examiner* — Pramila Parthasarathy
*Assistant Examiner* — Dao Ho
(74) *Attorney, Agent, or Firm* — Okamoto & Benedicto LLP

(57) ABSTRACT

There is described a key server which is connected to a local area network, and an encryption authority transfers private keys for clients of the local area network to the key server. In an embodiment, the key server encrypts outgoing emails using public keys for the recipients and decrypts internal emails using private keys for the recipients. In another embodiment, the clients of the local area network download their respective private keys from the key server so that encryption operations may be performed by client software.

15 Claims, 21 Drawing Sheets

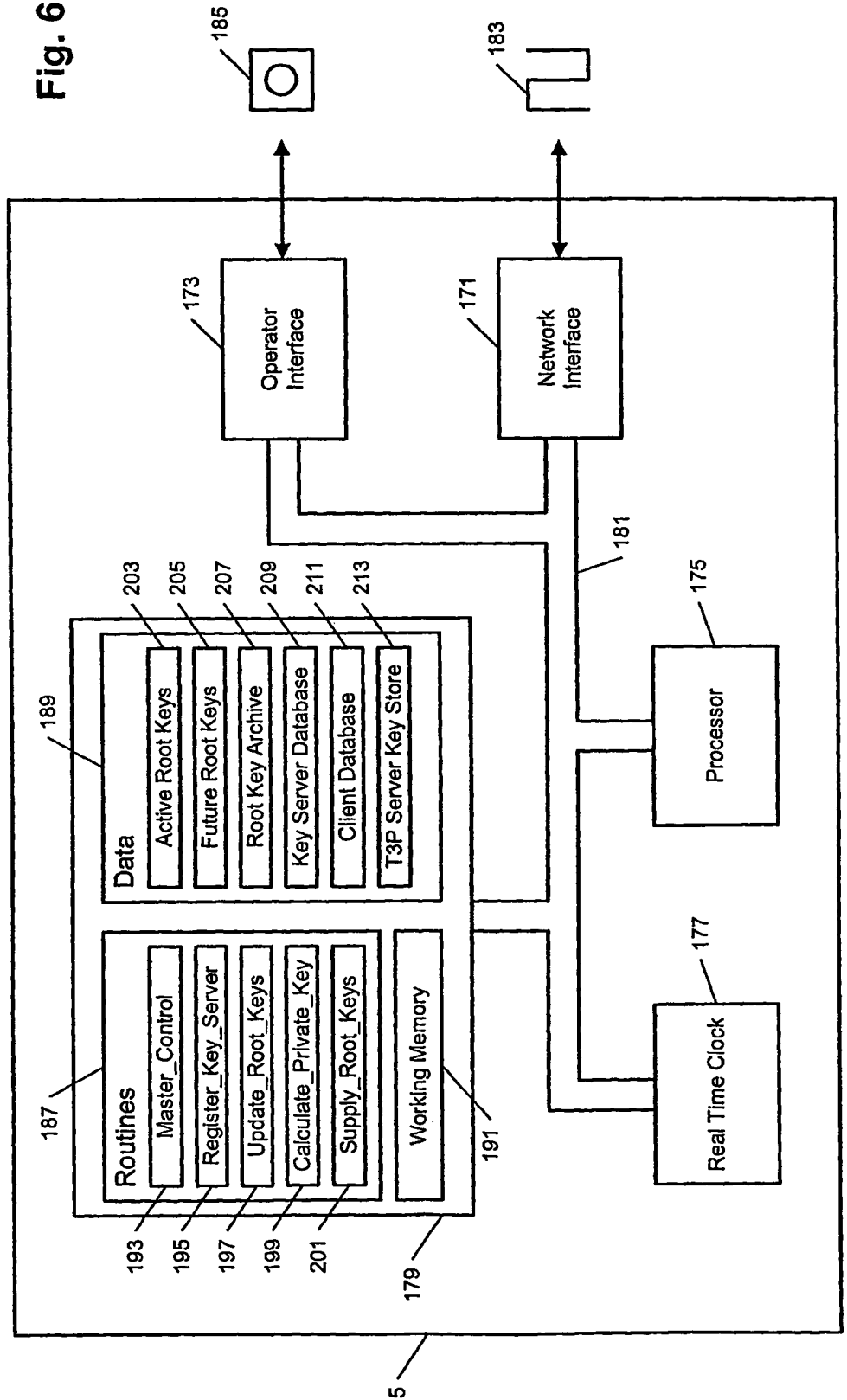

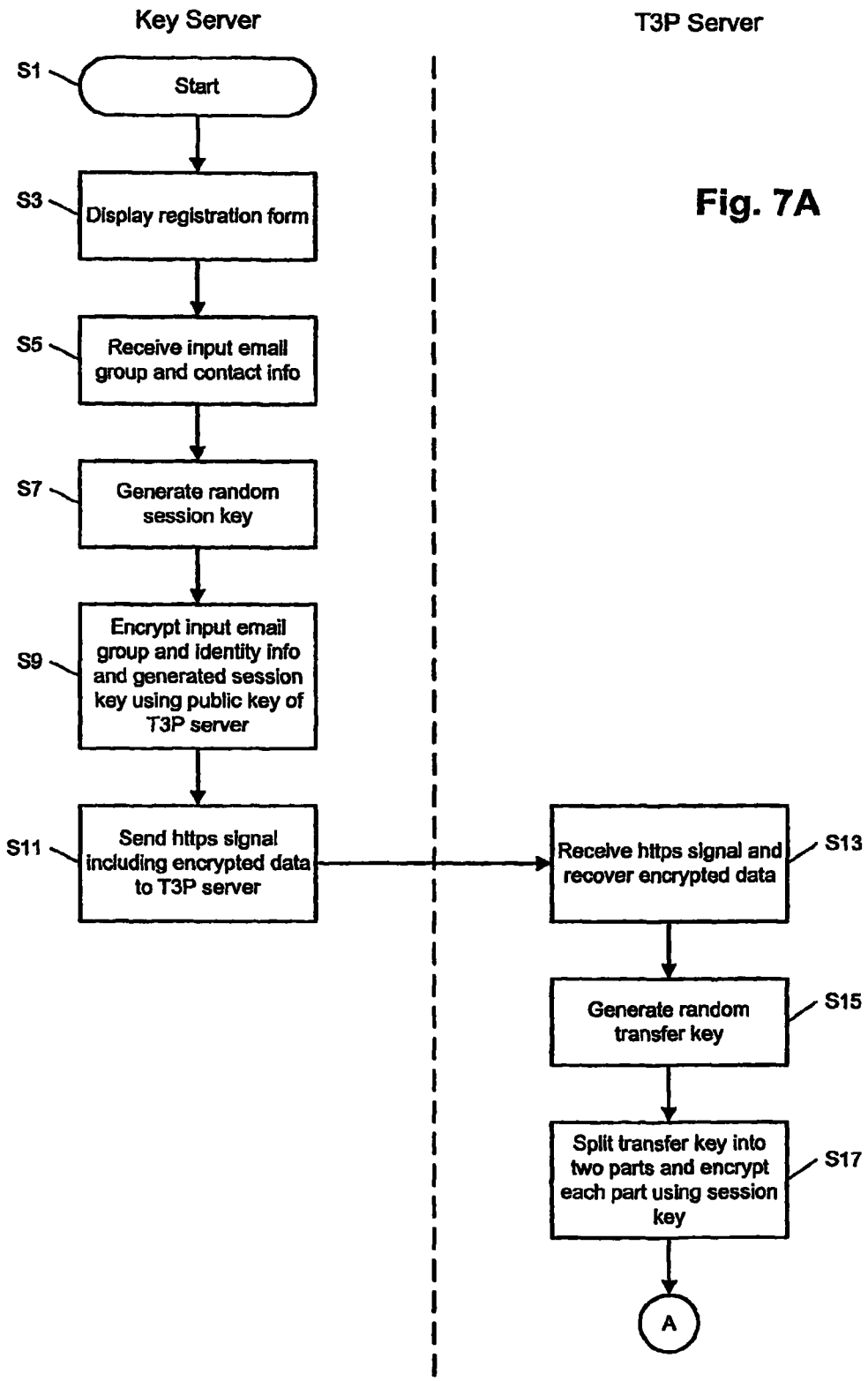

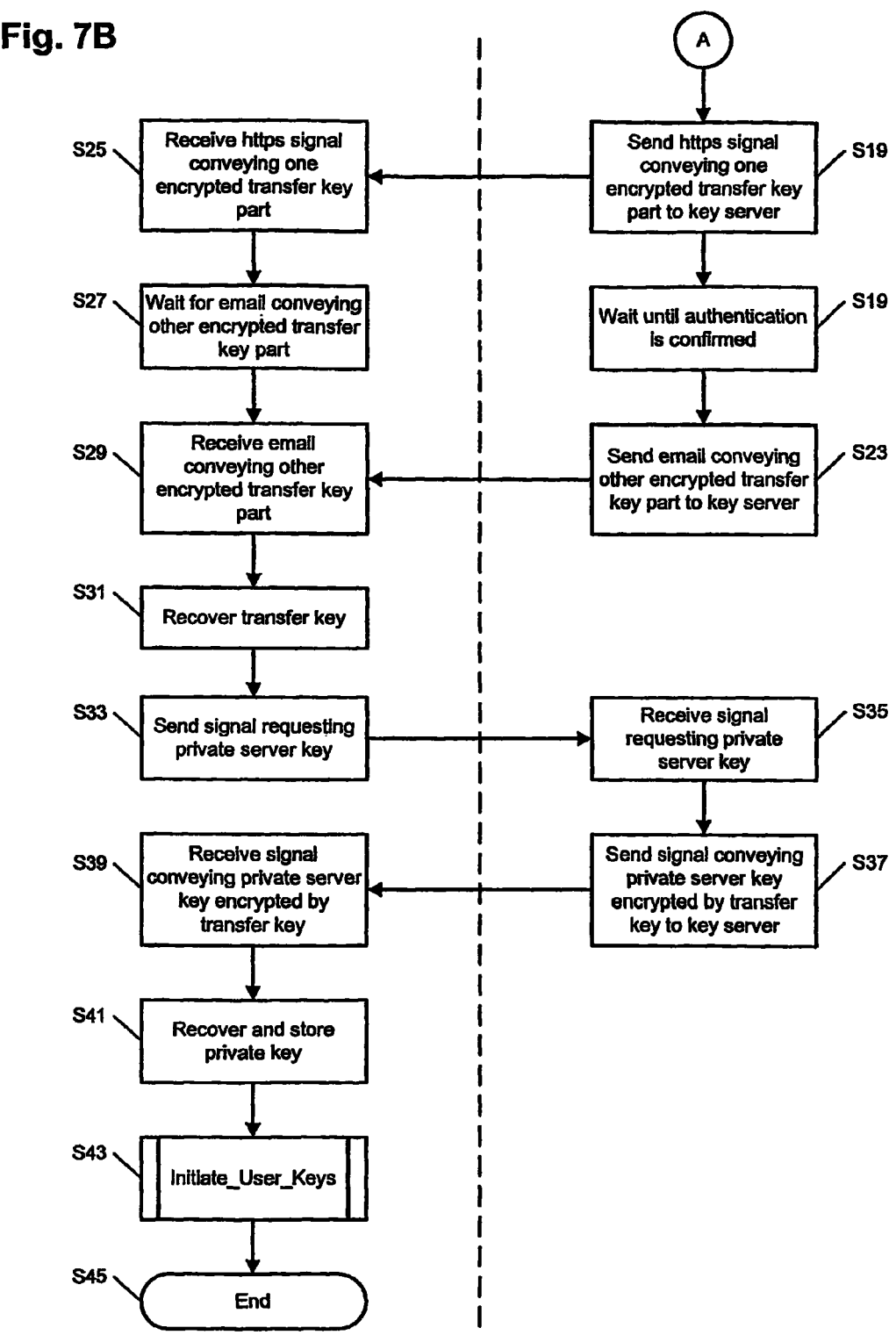

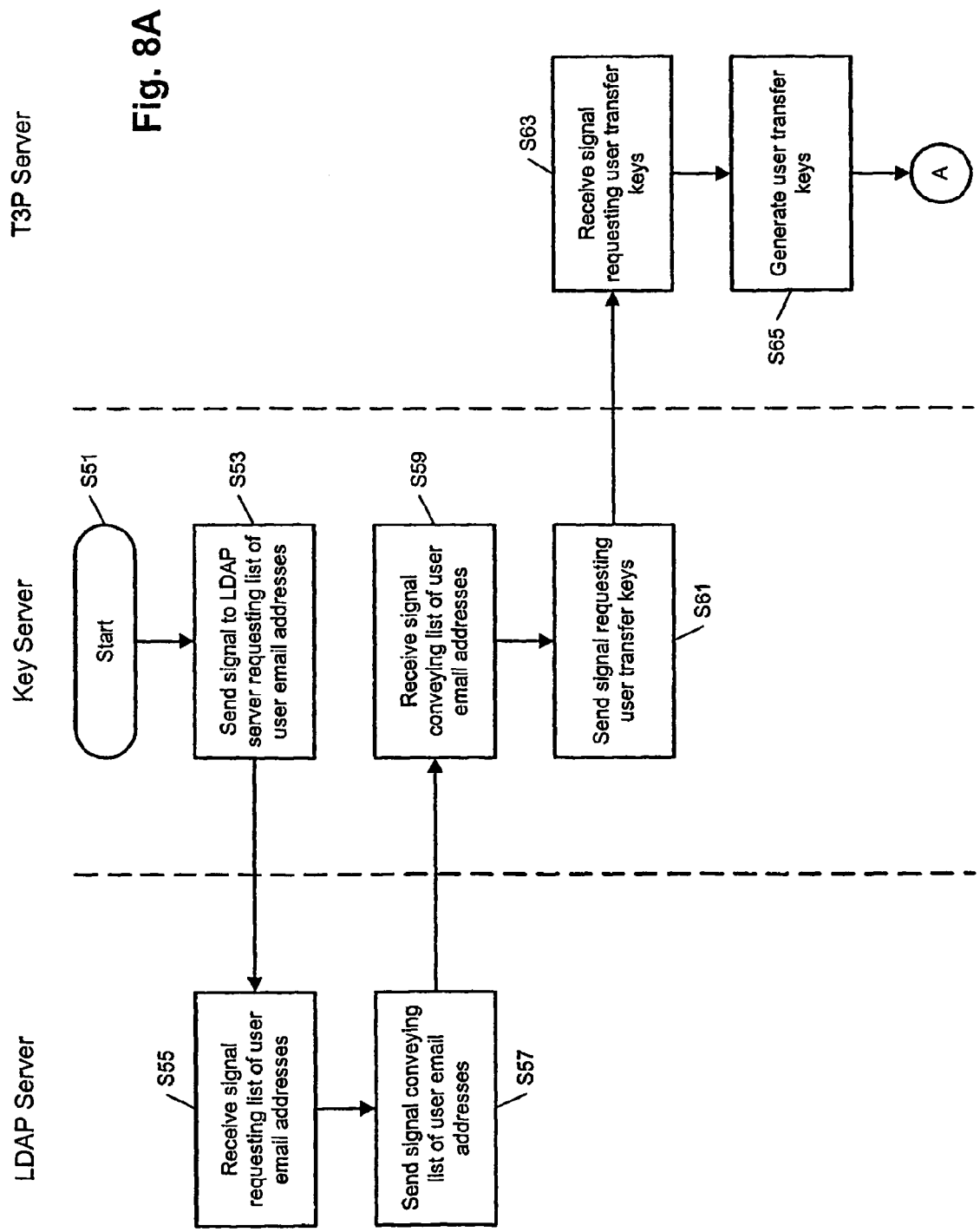

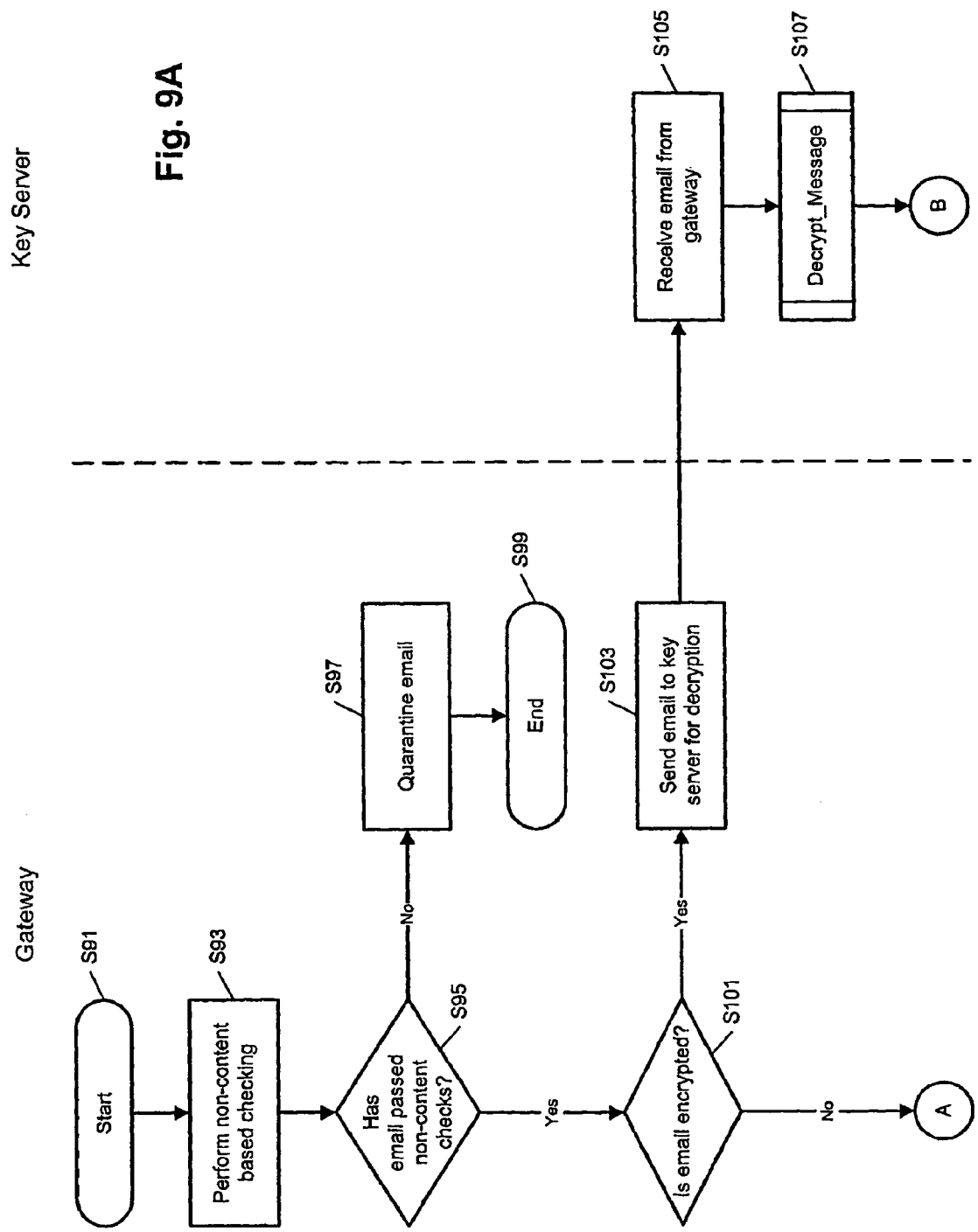

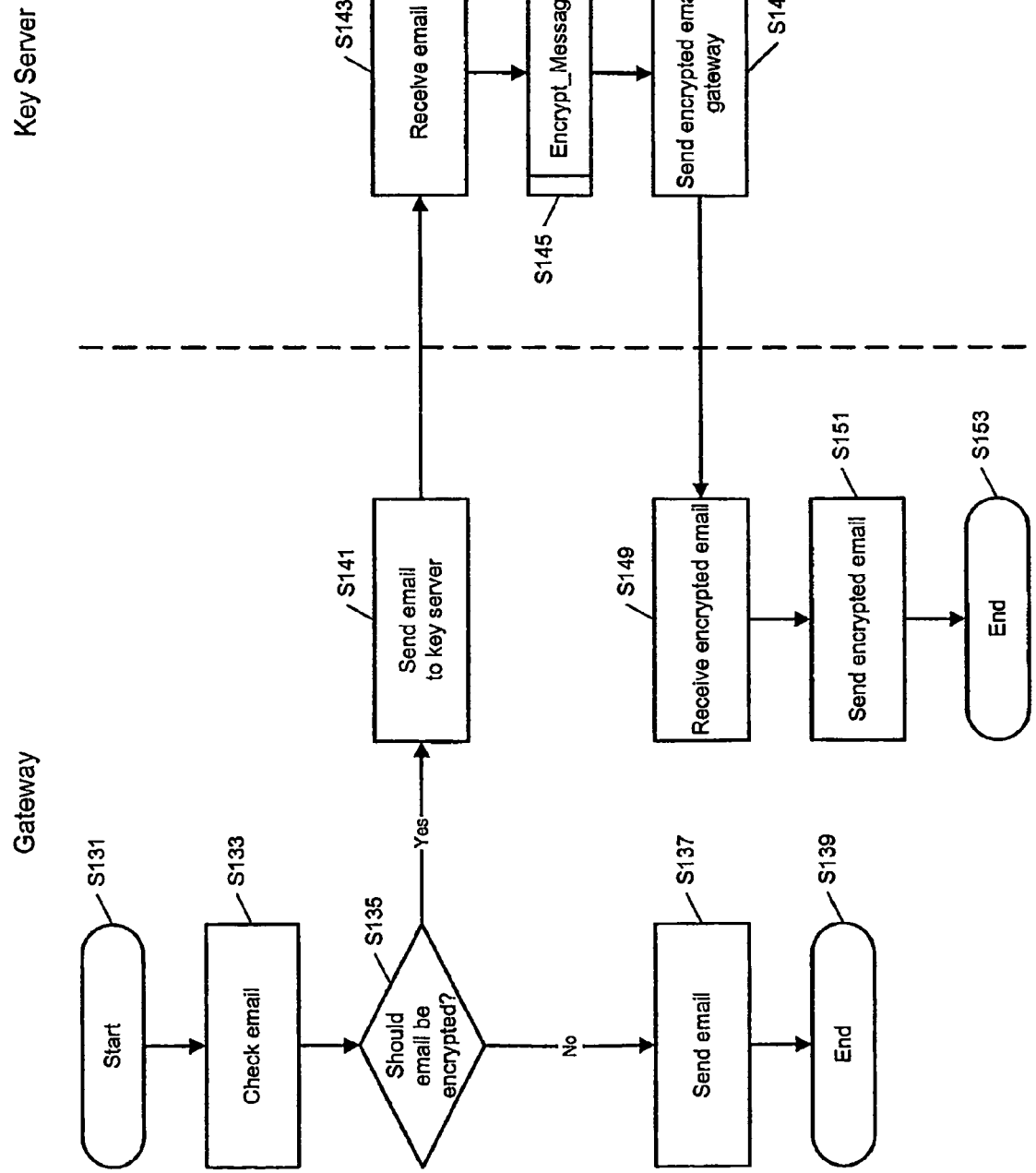

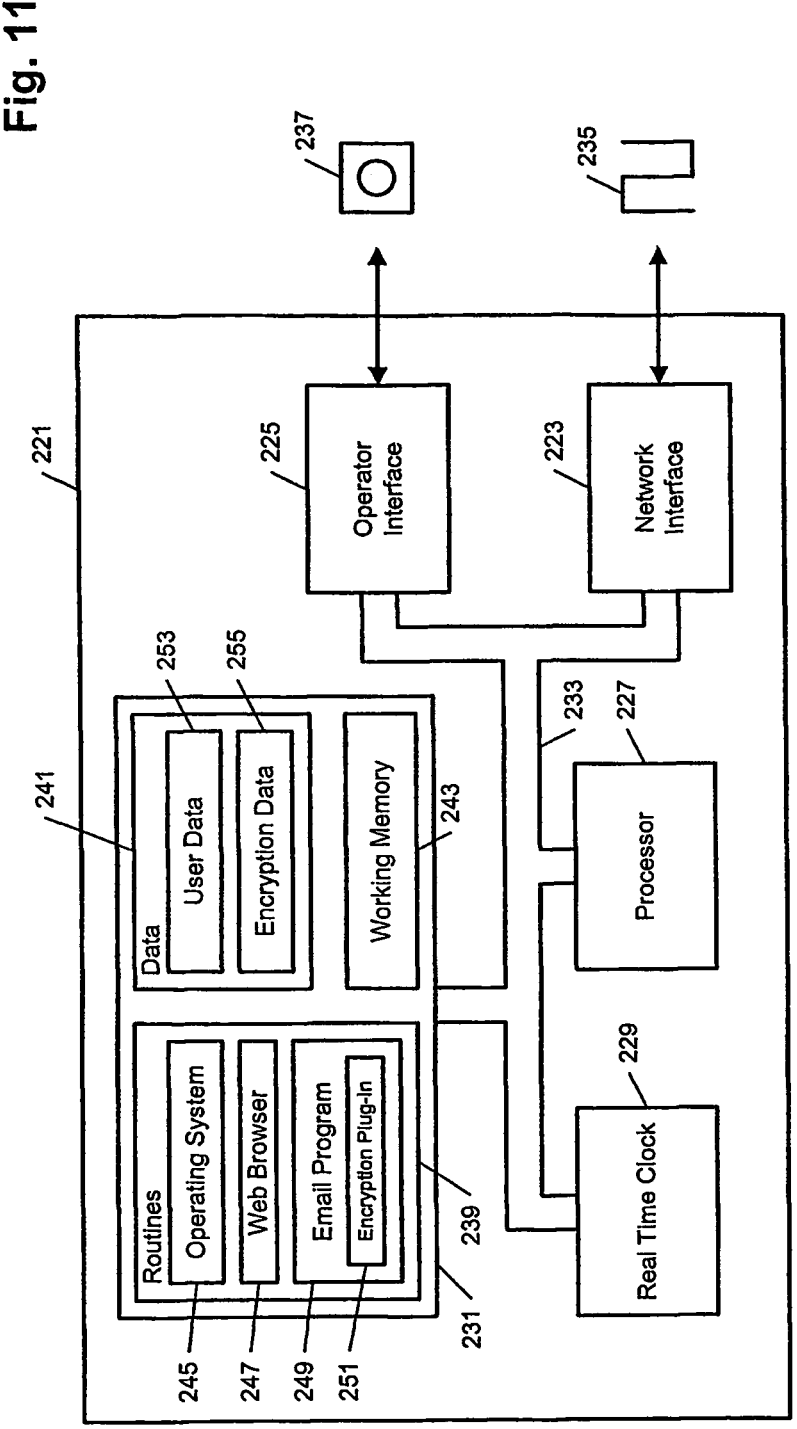

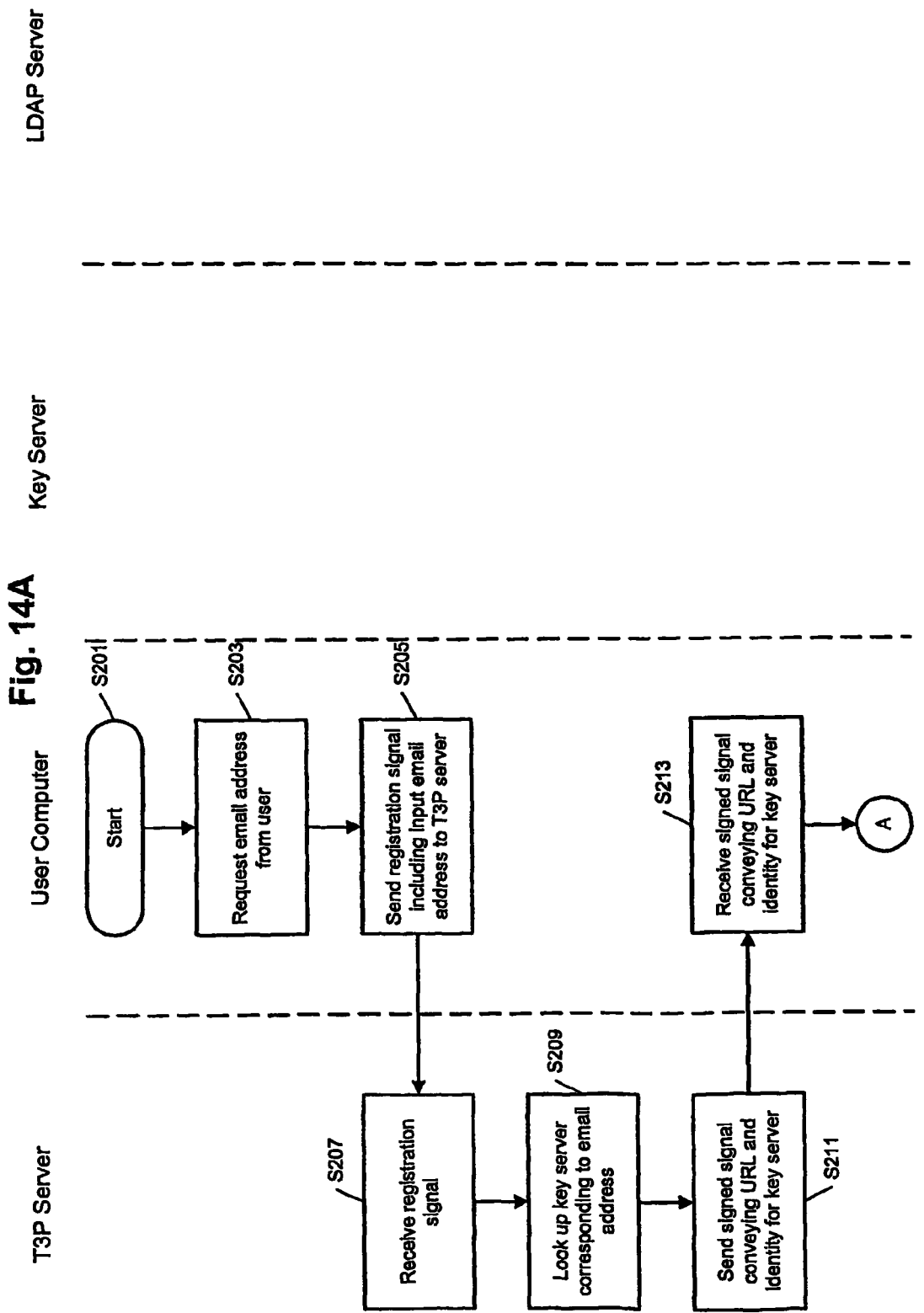

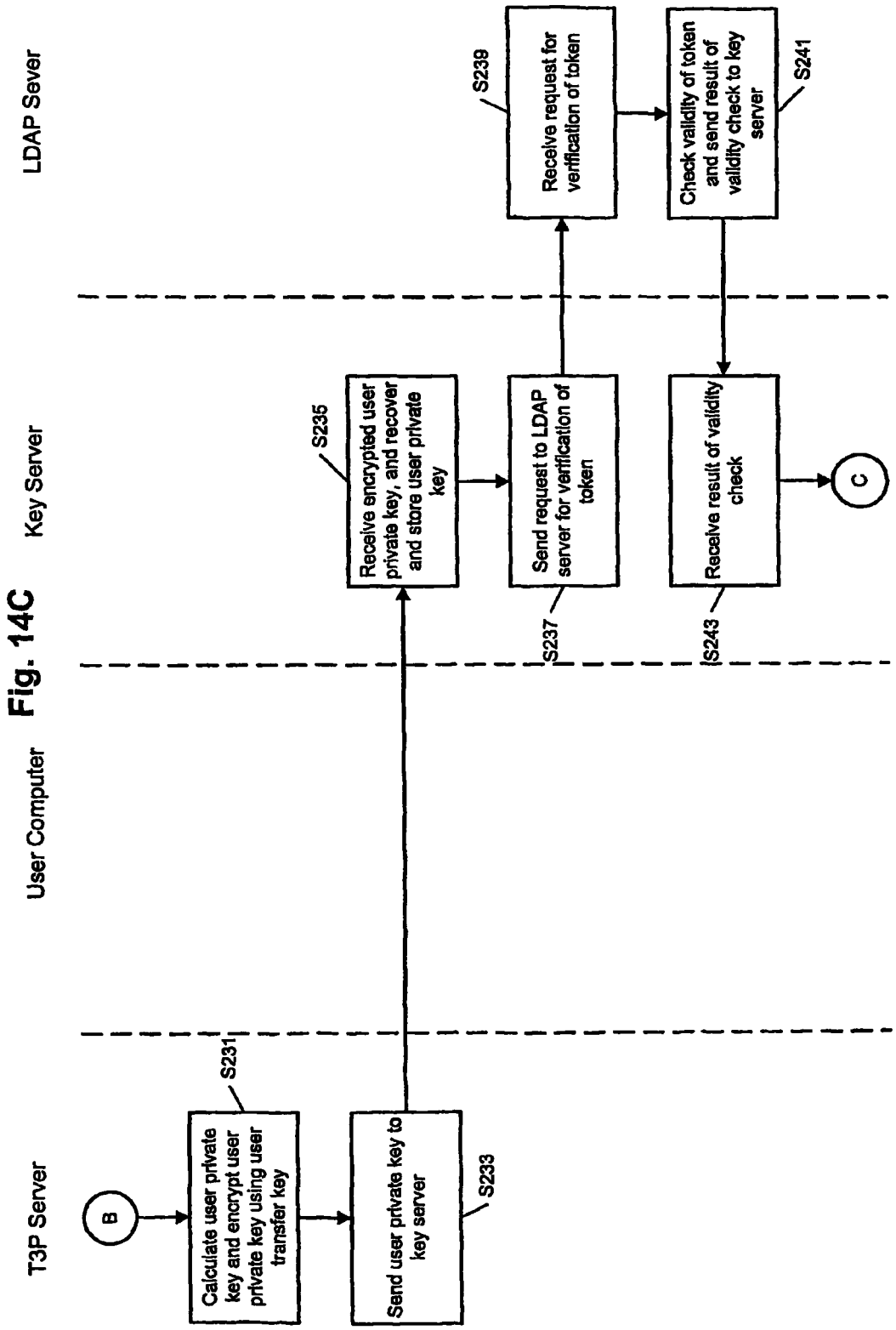

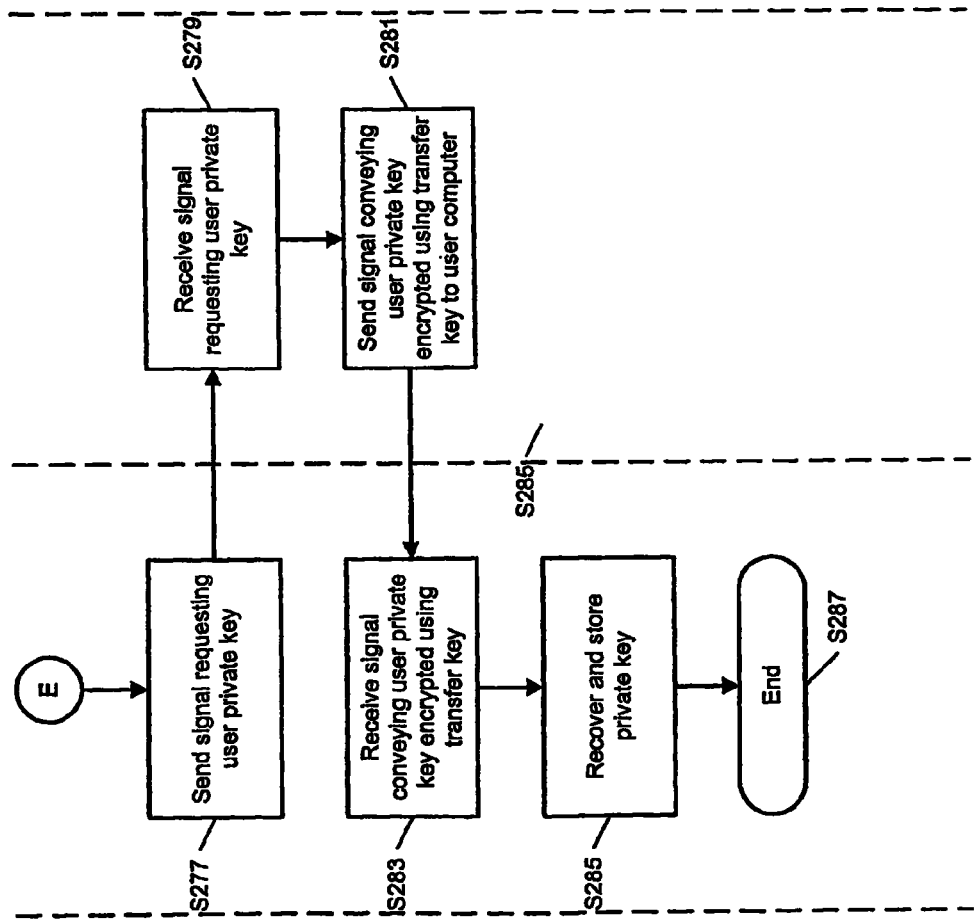

US 8,793,491 B2

ELECTRONIC DATA COMMUNICATION SYSTEM

BACKGROUND OF THE INVENTION

This invention relates to an electronic mail messaging system, and in particular to a system for sending messages to and receiving messages from a person electronically.

Electronic mail messaging programs, such as conventional email programs, are widely used. A problem with conventional email programs is that sent emails may be intercepted and read. There have been proposals to encrypt electronic mail messages using public key cryptography in which an asymmetric encryption algorithm is used. In particular, a public key associated with the recipient of an electronic mail message is used by the sender to encrypt the message. The resultant encrypted message can only be decrypted by using a private key which is different from the public key, with access to the private key being controlled by the recipient of the message.

Public key cryptography relies on the sender of the electronic mail message knowing that a public key is associated with a desired recipient. One way of achieving this is for cryptographic keys to be issued and verified by an encryption authority. However, this requires that any issued private keys are securely transmitted from the encryption authority to the associated clients of the encryption authority. One way of doing this is by sending to each client a respective transfer key which is used to encrypt the private key when in transit between the encryption authority and that client. By splitting the transfer key into parts and sending each part by a different transfer mechanism (e.g. sending one part using secure hypertext transfer protocol to a network address and sending another part by email to an electronic mail address), the security of the transfer key is improved.

Most corporations have an internal computing system, generally formed by one or more local area networks (LANS). Many corporations want to keep track of electronic mail messages entering and leaving the internal computing system, for example to check for viruses and spam. This can be problematic for encrypted electronic messages.

According to the present invention, a key server is connected to a local area network and an encryption authority transfers cryptographic keys for clients of the local area network to the key server.

In an embodiment, the key server encrypts outgoing emails using the public keys for the recipients and decrypts internal emails using the private keys for the recipients. Preferably, the key server also digitally signs outgoing emails using the private keys for the senders in order to verify the integrity of the sent emails.

In another embodiment, the clients of the local area network download their respective private keys from the key server so that encryption operations may be performed by client software. Preferably, incoming and outgoing encrypted emails can still be routed to the key server for decryption and checking.

In a preferred embodiment, a public key for an electronic mail address is generated from a root public key and the electronic mail address itself, while the private key for the electronic mail address is calculated by the encryption authority using the electronic mail address and a root private key which is kept secret by the encryption authority. An advantage of such a system is that the public key for an electronic mail address can be calculated even if no private key has been issued, in which case on receiving an encrypted electronic mail message the recipient can apply to the encryption authority for the private key to decrypt it.

DESCRIPTION OF THE DRAWINGS

Embodiments of the invention will now be described with reference to the attached Figures in which:

FIG. 6 schematically shows the main components of a trusted third party server forming part of the electronic mail messaging system illustrated in FIG. 1;

FIGS. 7A and 7B form a flow chart schematically showing operations performed by the key server and the trusted third party server to register the key server;

FIGS. 8A to 8C form a flow chart schematically showing operations performed by the key server, the trusted third party server and the LDAP server when the key server downloads an initial set of user private keys from the trusted third party server;

FIGS. 9A and 9B form a flow chart schematically showing operations performed by the gateway and the key server in response to receipt by the gateway of an email entering the local area network;

FIG. 10 is a flow chart showing operations performed by the gateway and the key server in response to receipt by the gateway of an email leaving the local area network;

FIG. 11 schematically shows the main components of a user computer of an alternative electronic mail messaging system to the electronic mail messaging system illustrated in FIG. 1;

FIGS. 14A to 14F form a flow chart showing operations performed by the user computer, the key server, the trusted third party server and the LDAP server when a user installs the encryption plug-in software in the user computer.

DETAILED DESCRIPTION

First Embodiment

Overview

Figure 1:
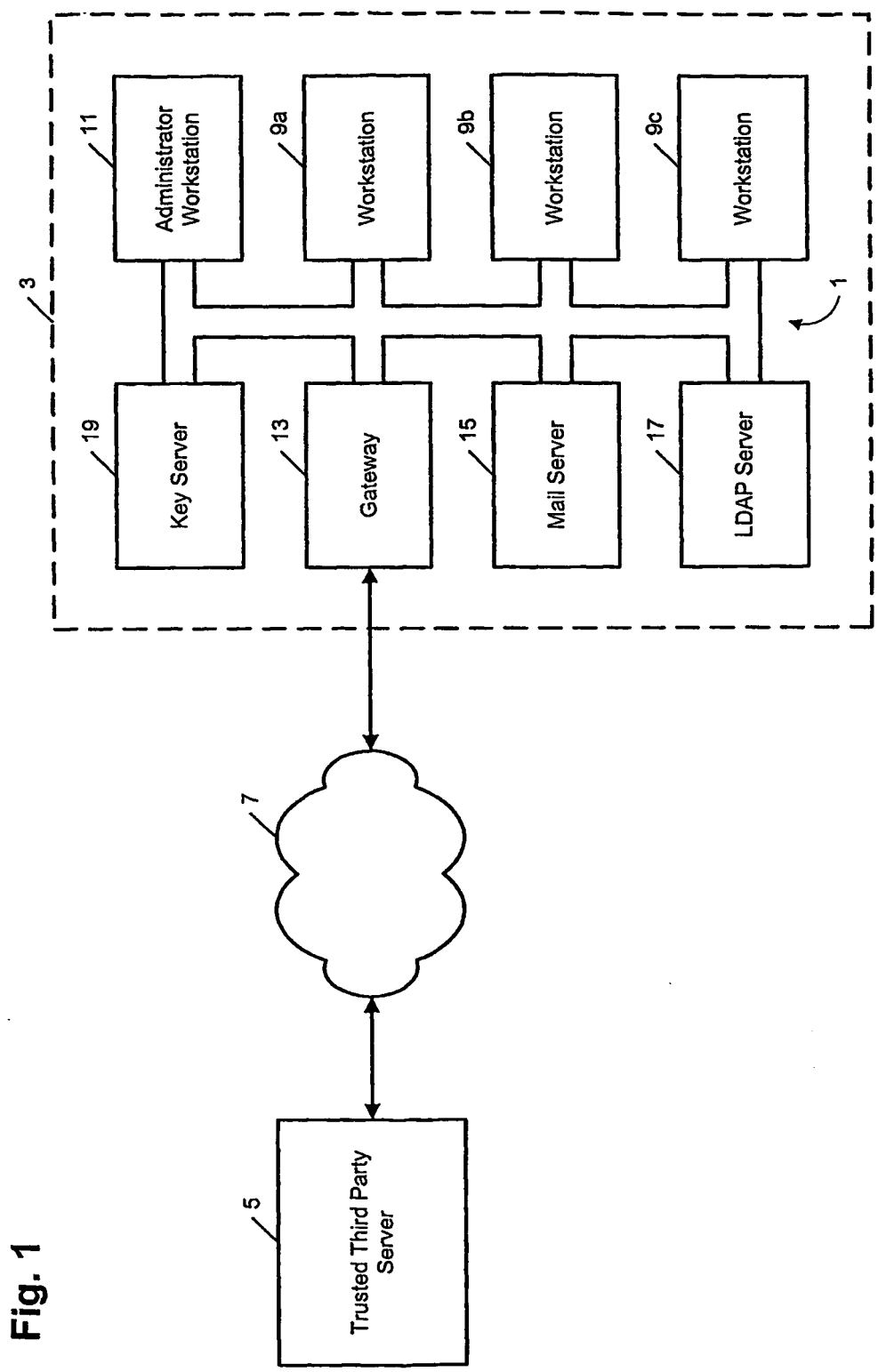
FIG. 1 schematically shows the main components of an electronic mail messaging system according to the present invention.

As shown in FIG. 1, in the first embodiment a local area network (LAN) 1 of a corporation (schematically represented by the dashed block 3 in FIG. 1) is connected to a trusted third party server 5 (hereafter called the T3P server 5) via the internet 7. A plurality of workstations 9a-9c (only three of which are shown for ease of illustration in FIG. 1) are connected to the LAN 1 together with an administrator workstation 11. A gateway 13 is connected to the LAN 1 and to the internet 7 so that all communication between the LAN 1 and the internet 7 passes through the gateway 13. A conventional mail server 15 and a conventional Lightweight Directory Access Protocol server 17 (hereafter called the LDAP server 17) are also connected to the LAN 1.

In this embodiment, a key server 19 is further connected to the LAN 1. The key server 19 stores cryptographic keys for the users of the workstations 9, and when appropriate encrypts emails outgoing from the LAN 1 through the gateway 13 and decrypts emails incoming to the LAN 1 through the gateway 13. In this embodiment, the cryptographic keys stored by the key server 19 include private keys for an asymmetric encryption algorithm which are downloaded from the T3P server 5, which is administered by an encryption key authority.

In this embodiment, the encryption key authority issues a public key certificate providing a root public key $K^G_{pub}$ for the encryption algorithm described in WO 03/017559, the whole contents of which is incorporated herein by reference. According to this encryption algorithm, the public key $K^c_{pub}$ for a client having an electronic mail address "client_ID" is given by:

$$K_{pub}{}^c = F(\text{client\_ID}, K_{pub}{}^G)$$

where F is a publicly available function. In this way, the public key associated with a client can be calculated by anyone knowing the email address of the client, the root public key $K^G_{pub}$ of the encryption authority and the function F (all of which are publicly available).

The private key associated with a client can only be calculated with knowledge of the root private key $K^G_{pri}$, which is kept secret by the encryption authority. In particular, the private key $K^c_{pri}$ for a client having an electronic mail address "client_ID" is calculated by the T3P server 5 in accordance with the relation:

$$K_{pri}{}^c = G(\text{client\_ID}, K_{pri}{}^G)$$

where G is a function which is paired with F.

Throughout the remainder of this description, unless otherwise indicated reference to data being asymmetrically encrypted using a public key means that the data is encrypted using the asymmetric encryption algorithm described in WO 03/017559 with the public key forming the cryptographic key, and similarly reference to data being asymmetrically decrypted using a private key means that the data is decrypted using the asymmetric encryption algorithm described in WO 03/017559 with the private key forming the cryptographic key.

Reference will also be made throughout the description to data being symmetrically encrypted or decrypted using a symmetric key. Unless otherwise indicated, this refers to encryption or decryption of the data using the Advanced Encryption Standard (AES) algorithm using the symmetric key as the cryptographic key.

In order to send an encrypted email, in this embodiment a so-called KEM-DEM approach is employed in which an encrypted electronic mail message is formed by a Key Encapsulation Mechanism (KEM) part storing a session key (which is unique to the message) asymmetrically encrypted using the public key of the recipient, and a Data Encapsulation Mechanism (DEM) part storing the electronic mail message symmetrically encrypted using the session key. In particular, for each recipient the KEM part stores the session key asymmetrically encrypted using the public key for that recipient, and the KEM part also stores the session key asymmetrically encrypted by the public key for the sender. In this way, the relatively intensive processing operations of the asymmetric encryption algorithm are only required to recover the session key, and the less intensive processing of the symmetric encryption algorithm are used to recover the message.

Further details of the KEM-DEM approach used can be found in WO 2005/050908, which is hereby incorporated herein by reference.

As the private keys for the client are generated by the T3P server 5, a problem exists in how to make the generated private keys available for use. As will be described in detail below, in this embodiment secure communications is established between the T3P server 5 and the key server 19 to facilitate the downloading of private keys associated with users of the LAN 1.

For a corporation, such as the one having the LAN 1 of this embodiment, it is normal for the corporation to perform checks on the emails being received and being sent out in order to inhibit the proliferation of computer viruses and to filter out spam email. However, a problem exists in performing these checks when the content of the emails is encrypted. As will be described in detail below, in this embodiment when required the key server 19 decrypts an incoming email encrypted using a public key associated with one of the users of the LAN 1 to allow checks on the content of the email to be performed prior to that email being delivered to the addressee.

The main components of the gateway 13, the key server 19, the LDAP server 17 and the T3P server 5 will now be described in more detail.

The Gateway

Figure 2:
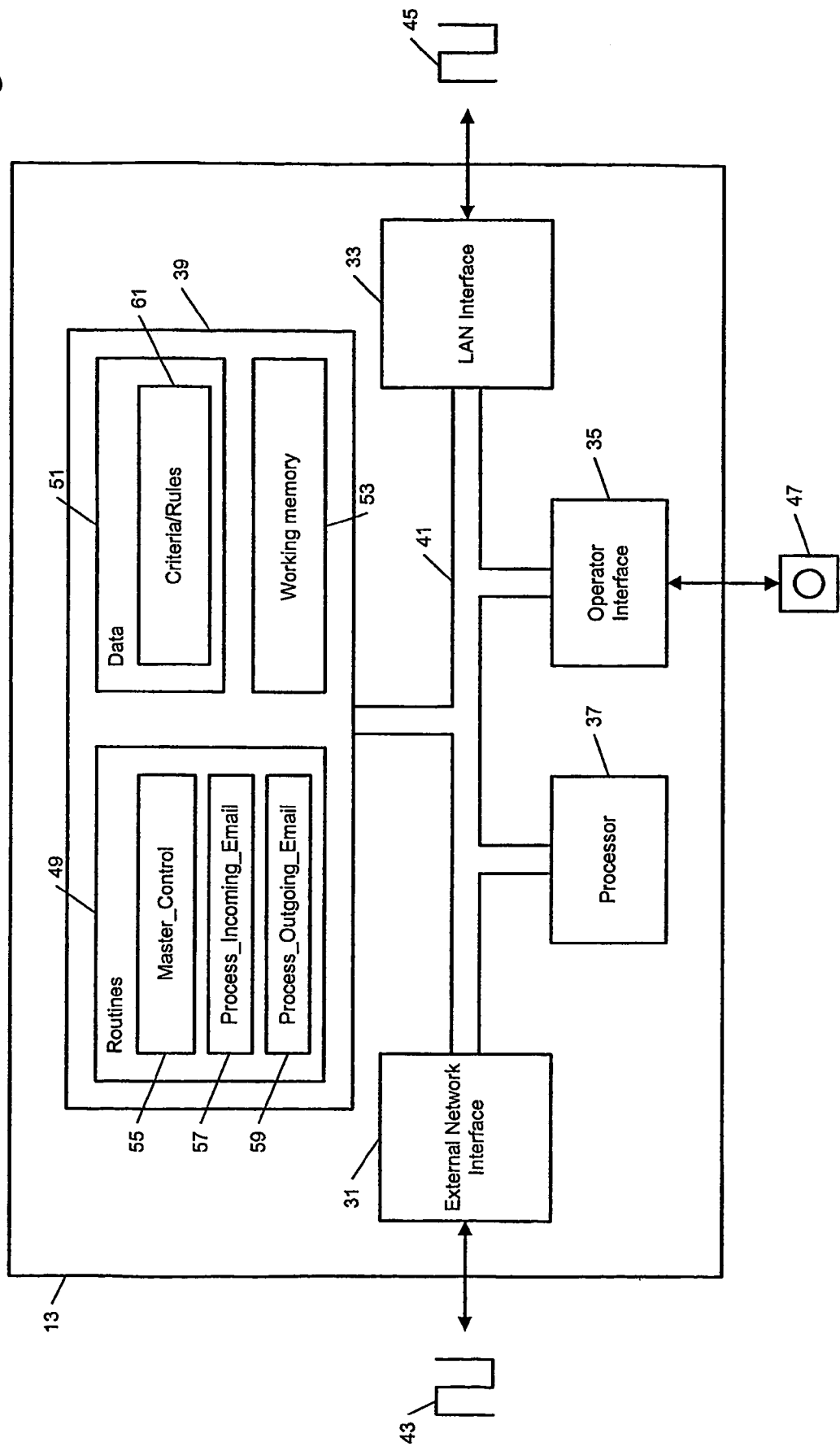
FIG. 2 schematically shows the main components of a gateway attached to a local area network forming part of the electronic mail messaging system illustrated in FIG. 1.

As shown in FIG. 2, the gateway 13 has an external network interface 31, a LAN interface 33, an operator interface 35, a processor 37 and memory 39 interconnected by a bus system 41.

The external network interface 31 receives data from and outputs data to the internet in the form of network signals 43. Similarly, the LAN interface 33 receives data from and outputs data to the LAN 1 in the form of network signals 45.

The operator interface 35 includes a keyboard (not shown in FIG. 2) for allowing an operator to enter data into the gateway 13 and a display (not shown in FIG. 2) for allowing an operator to read data produced by the gateway 13. The operator interface 35 also includes a CD-ROM reader/writer via which data stored on a CD-ROM 47 can be input into the gateway 13 or data produced by the gateway 13 can be written onto a recordable CD-ROM 47.

The processor 37 performs processing operations in accordance with program routines stored in the memory 39. These program routines may be either stored during manufacture, or input to the gateway 13 via the operator interface 35, the external network interface 31 or the LAN interface 33. The program routines process data stored in the memory 39 and data received via the operator interface 35, the external network interface 31, or the LAN interface 33.

As is conventional, the memory 39 is formed by different types of memory, each having different access times for retrieving data stored therein. For example, the memory 39 includes hard drive regions with a comparatively slow access time and random access memory RAM (regions) having a comparatively fast access time. Conventional processing techniques are employed to improve the speed of processing by caching data likely to be required into RAM in advance.

The memory 39 includes a region 49 storing the program routines used by the gateway 13, a region 51 storing data and a region 53 providing working memory.

In particular, the program routine's memory region 49 stores:

a Master_Control routine 55;
a Process_Incoming_Email routine 57; and
a Process_Outgoing_Email routine 59.

The stored data memory region 51 stores a set of criteria/rules 61 which are used during the processing of incoming and outgoing emails.

The Key Server

Figure 3:
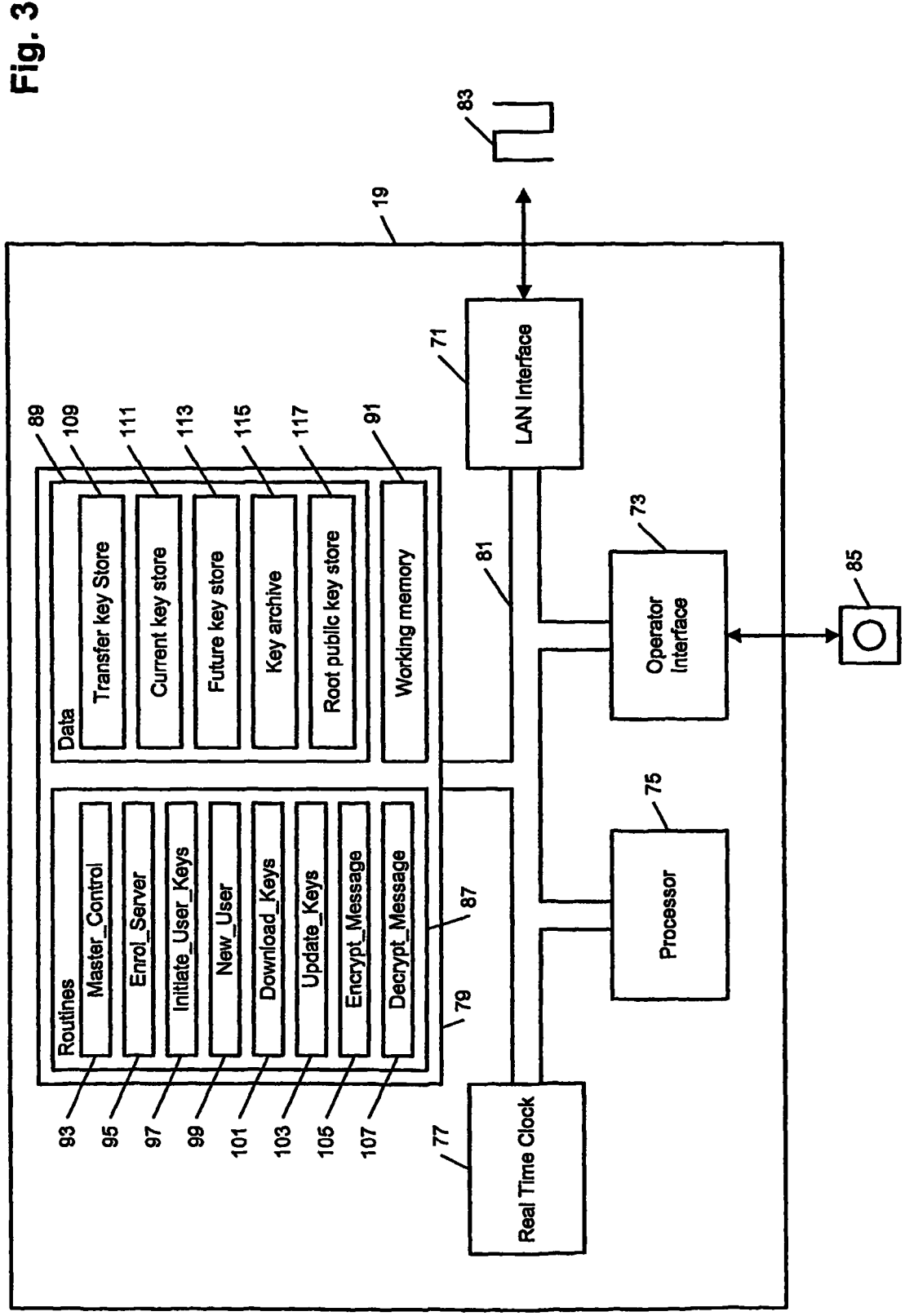
FIG. 3 schematically shows the main components of a key server attached to the local area network forming part of the electronic mail messaging system illustrated in FIG. 1.

As shown in FIG. 3, the key server 19 includes a LAN interface 71, an operator interface 73, a processor 75, a real time clock 77 and a memory 79 which are interconnected by a bus system 81.

The LAN interface 71 receives data from and outputs data to the remainder of the LAN 1 in the form of network signals 83. The operator interface 73 includes a keyboard (not shown in FIG. 3) for an operator to enter data into the key server 19 and a display (not shown in FIG. 3) for allowing an operator to read data produced by the key server 19.

The operator interface 73 also includes a CD-ROM reader-writer via which data stored on a CD-ROM 85 can be input into the key server 19 or data produced by the key server 19 can be written onto a recordable CD-ROM 85.

The real time clock 77 provides time and date information which are used by the key server 19.

The processor 75 performs processing operations in accordance with program routines stored in the memory 79. These program routines may be either stored during manufacture, or input to the key server 19 via the operator interface 73 or the LAN interface 71. The program routines process data stored in the memory 79 and data received via the operator interface 73 or the LAN interface 71.

In the same manner as the memory 39 of the gateway 13, the memory 79 is formed by different types of memory having respectively different access times, and conventional processing techniques are employed to improve the speed of processing by caching data likely to be required into fast access time memory in advance.

The memory 79 includes a region 87 storing the program routines used by the key server 19, a region 89 storing data and a region 91 providing working memory.

In particular, the program routine's memory region 87 stores:
  a Master_Control routine 93;
  an Enrol_Server sub-routine 95;
  an Initiate_User_Key sub-routine 97;
  a New_User sub-routine 99;
  a Download_Key sub-routine 101;
  an Update_Key sub-routine 103;
  an Encrypt_Message sub-routine 105; and
  a Decrypt-Message sub-routine 107.

The stored data memory region 89 stores:
  a transfer key store 109 which stores a table associating a key server transfer key with the key server 19 and respective user transfer keys with each user of the LAN 1;
  a current key store 111 storing the current private key for the key server 19 and the current private key for each user of the LAN 1;
  a future key store 113 storing private keys for the key server 19 and the users of the LAN 1 for future use;
  a key archive 115 storing cryptographic keys which have previously been used; and
  a root public key store 117 storing a public key certificate including the root public key $K^G_{pub}$.

It will be appreciated that access to the cryptographic key information stored in the stored data memory region 89 needs to be restricted. In particular, the conventional secure data storage techniques provided by modern operating systems such as Windows and UNIX are used to ensure that the cryptographic key information may only be accessed by dedicated user in whose context the defined program routines operate.

The LDAP Server

Figure 4:
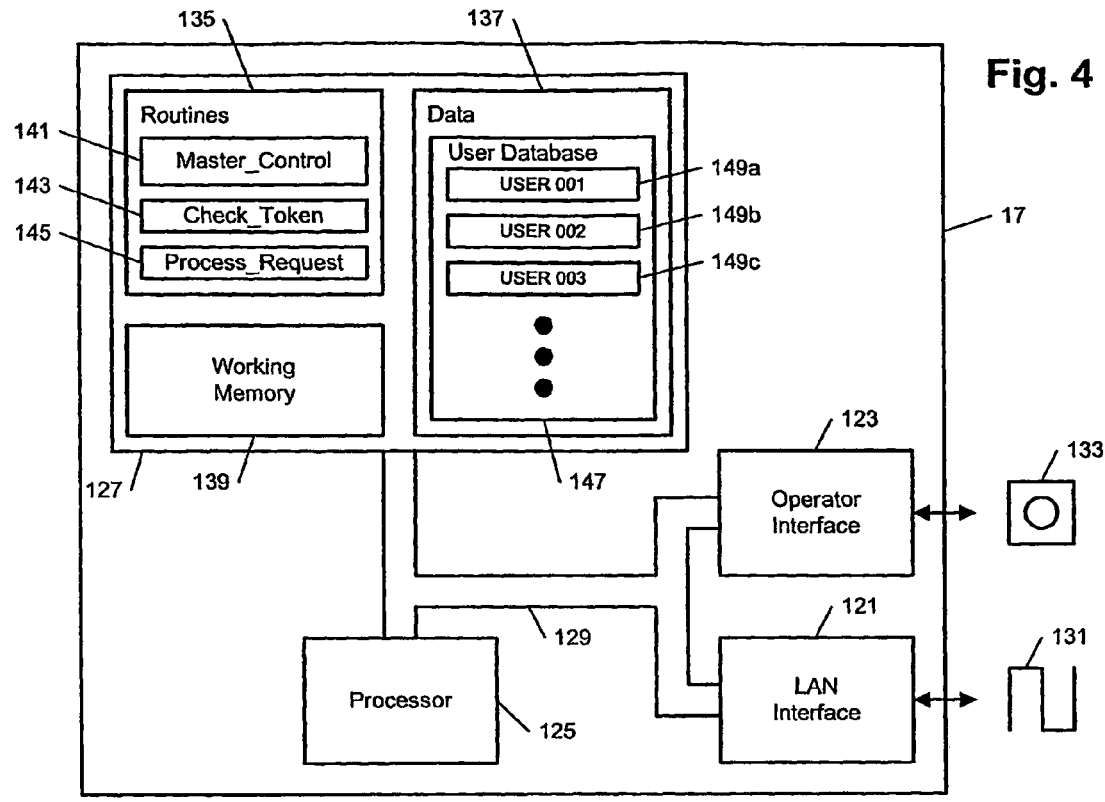
FIG. 4 schematically shows the main components of an LDAP server attached to the local area network forming part of the electronic mail messaging system illustrated in FIG. 1.

As shown in FIG. 4, the LDAP server 17 has a network interface 121, an operator interface 123, a processor 125 and memory 127 interconnected by a bus system 129.

The network interface 121 receives data from and outputs data to the remainder of the LAN 1 in the form of network signals 131.

The operator interface 123 includes a keyboard for allowing an operator to enter data into the LDAP server 17 and a display for allowing an operator to read data produced by the LDAP server 17. The operator interface 123 also includes a CD-ROM reader/writer via which data stored on a CD-ROM 133 can be input into the LDAP server 17 or data can be written onto a recordable CD-ROM 133.

The processor 125 performs processing operations in accordance with program routines stored in the memory 127. These program routines may be either stored during manufacture, or input to the LDAP server 17 via the operator interface 123 or the LAN interface 121. The program routines process data stored in the memory 127 and data received via the operator interface 123 and the LAN interface 121.

In the same manner as the memory 39 of the gateway 13, the memory 127 is formed by different types of memory having respective different access times, and conventional processing techniques are employed to improve speed of processing by caching data likely to be required into fast access memory in advance.

The memory 127 includes a region 135 storing the program routines used by the LDAP server 17, a region 137 storing data and a region 139 providing working memory.

In particular, the program routine's memory region 135 stores:
  a Master_Control routine 141;
  a Check_Token sub-routine 143; and
  a Process_Request sub-routine 145.

Figure 5:
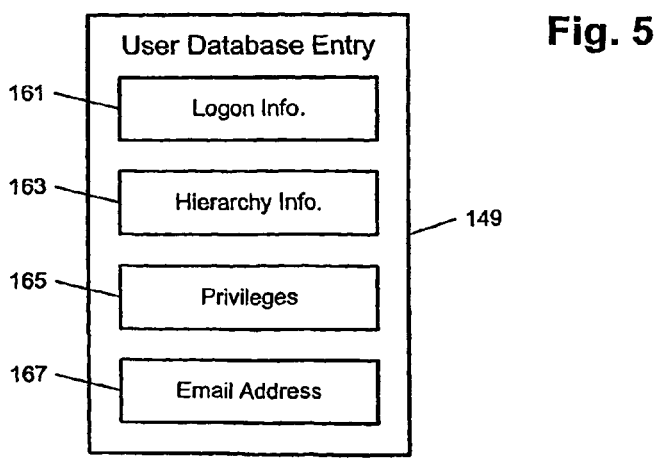
FIG. 5 schematically shows the data stored for a user in a user database forming part of the LDAP server illustrated in FIG. 4.

The stored data memory region 137 stores, amongst other data, a user database 147 having entries 149a-149c for each user of the LAN 1. As shown in FIG. 5, each entry 149 in the user database stores:
  logon information 161 including user name and password;
  hierarchy information 163 indicating the position of the user within the hierarchy of the corporation;
  privileges information 165 indicating which operations the user is allowed to perform on the LAN 1 (for example whether the user has administrator privileges or not); and
  email address information 167.

The Trusted Third Party Server

As shown in FIG. 6, the T3P server 5 has a network interface 171, an operator interface 173, a processor 175, a real time clock 177 and memory 179 interconnected by a bus system 181.

The network interface 171 receives data from and outputs data to the internet 7 in the form of network signals 183. The operator interface 173 includes a keyboard (not shown in FIG. 6) for an operator to enter data into the T3P server 5 and a display (not shown in FIG. 6) for allowing an operator to read data produced by the T3P server 5. The operator interface 173 also includes a CD-ROM reader-writer via which data stored on a CD-ROM 185 can be input into the T3P server 5 or data produced by the T3P server 5 can be written onto a recordable CD-ROM 185.

The real time clock 177 provides time and date information which are used by the T3P server 5.

The processor 175 performs processing operations in accordance with program routines stored in the memory 179. These program routines may be either stored during manufacture, or input to the T3P server 5 via the operator interface 173 or the network interface 171. The program routines process data stored in the memory 179 and data received via the operator interface 173 or the network interface 171.

In the same manner as the memory 39 of the gateway 13, the memory 179 is formed by different types of memory having respectively different access times, and conventional processing techniques are employed to improve the speed of processing by caching data likely to be required into fast access time memory in advance.

The memory 179 includes a region 187 storing the program routines used by the T3P server 5, a region 189 storing data and a region 191 providing working memory.

In particular, the program routine's memory region 187 stores:
- a Master_Control routine 193;
- a Register_Key_Server sub-routine 195;
- a Generate_Root_Keys sub-routine 197;
- a Calculate_Private_Keys sub-routine 199; and
- an Update_Root_Keys sub-routine 201.

The stored data memory region 189 stores:
- active root keys information 203 storing the root public key $K^G_{pub}$ and root private key $K^G_{pri}$ currently in use;
- future root keys information 205 storing root public and private key pairs which will be used in the future;
- root key archive information 207 storing root public and private key pairs which have previously been used, together with the time periods during which each public and private key pair was used;
- a key server database 209 storing information about key servers registered by the T3P server 5;
- a client database 211 storing information about individual users who are registered by the T3P server 5, including for each user an associated transfer key and information identifying any key server which is permitted to receive the private key for the user; and
- a T3P server key store 213 storing a public key/private key pair associated with the T3P server.

The main operations performed in the electronic mail messaging system of this embodiment will now be described.

Installation of Key Server

The installation of the key server 19 is started by an operator initiating, using the operator interface 73 of the key server 19, an installation process. In response to the operator initiating the installation process, the Master_Control routine 93 initiates the Enrol_Server sub-routine 95, which will now be described with reference to FIGS. 7A and 7B.

After the Enrol_Server sub-routine 95 is initiated, at S1, the key server 19 displays, at S3, a registration form using the display of the operator interface 73. The registration form includes data entry fields for receiving contact information for the operator of the key server 19 and for specifying the range of email addresses for which the key server 19 wishes to obtain corresponding private keys. This range of email addresses can, for example, correspond to particular email addresses, particular domain ranges (e.g. all users for abc-.co.uk) or sub-domain ranges (e.g. all users for def.abc-.co.uk), or a combination of email addresses, domain ranges and domain sub-ranges.

After receiving, at S5, the input email group information and contact information, the key server 19 generates, at S7, a random session key. The key server 19 then encrypts the input email group information, electronic address information for the key server 19 and the generated session key using a public key specified by a public key certificate associated with the T3P server 5 (which, if necessary, is downloaded from the internet). The key server 19 then sends, at S11, an HTTPS signal to the T3P server 5 requesting registration of the key server 19 and including the encrypted data.

On receiving, at S13, the HTTPS signal requesting key server registration, the Master_Control routine 193 of the T3P server 5 initiates the Register_Key_Server sub-routine 195. The T3P server 5 decrypts the encrypted data using the private key for the T3P server 5 to recover the email group information, the electronic address information and the session key. The T3P server 5 then generates, at S15, a random transfer key, which will hereafter be called the key server transfer key. The key server transfer key is used to encrypt symmetrically data sent between the T3P server 5 and the key server 19.

After generating the key server transfer key, the T3P server 5 splits, at S17, the key server transfer key into two parts and then symmetrically encrypts each part using the recovered session key. The T3P server 5 then sends, at S19, an HTTPS signal conveying one encrypted key server transfer key part to the network address of the key server 19. The T3P server then waits, at S21, until the authorisation of the operator of the key server 19 to receive the private keys for the specified group of email addresses has been confirmed by the operator of the T3P server 5. This confirmation proceeds in accordance with a predefined procedure involving, among other things, checks that the person specified in the contact information is properly associated with the group of email addresses. After this confirmation has been received, the T3P server 5 sends, at S23, an email conveying the other encrypted key server transfer key part to the electronic mail address of the key server 19.

On receiving, at S25, the HTTPS signal conveying the first encrypted key server transfer key part, the key server 19 waits, at S27, for the email conveying the other encrypted key server transfer key part. On receiving, at S29, the email conveying the other encrypted key server transfer key part, the key server 19 recovers, at S31, the key server transfer key and securely stores the key server transfer key in the transfer key store 109. The key server 19 then sends, at S33, a signal to the T3P server 5 requesting transmission of a private key for the key server 19.

When the T3P server 5 receives, at S35, the signal requesting the private key for the key server 19, the T3P server 5 generates the private key corresponding to the electronic address information for the key server 19 using the currently active root private key $K^G_{pri}$, symmetrically encrypts the key server private key using the key server transfer key, and then sends, at S37, an HTTPS signal conveying the encrypted key server private key to the key server 19.

When the key server 19 receives the HTTPS signal conveying the encrypted key server private key, the key server 19 recovers, at S41, the key server private key and then stores the key server private key in the current key store 111 of the stored data memory region 89. Having now received the key server private key, the key server 19 is able to add a conventional digital signature to any message sent to the T3P server 5 to allow the T3P server 5 to verify that the message originated from the key server 19 and that the message has not been tampered with in transit. In this description, a message with a digital signature is referred to as a signed message.

Figure 8B:
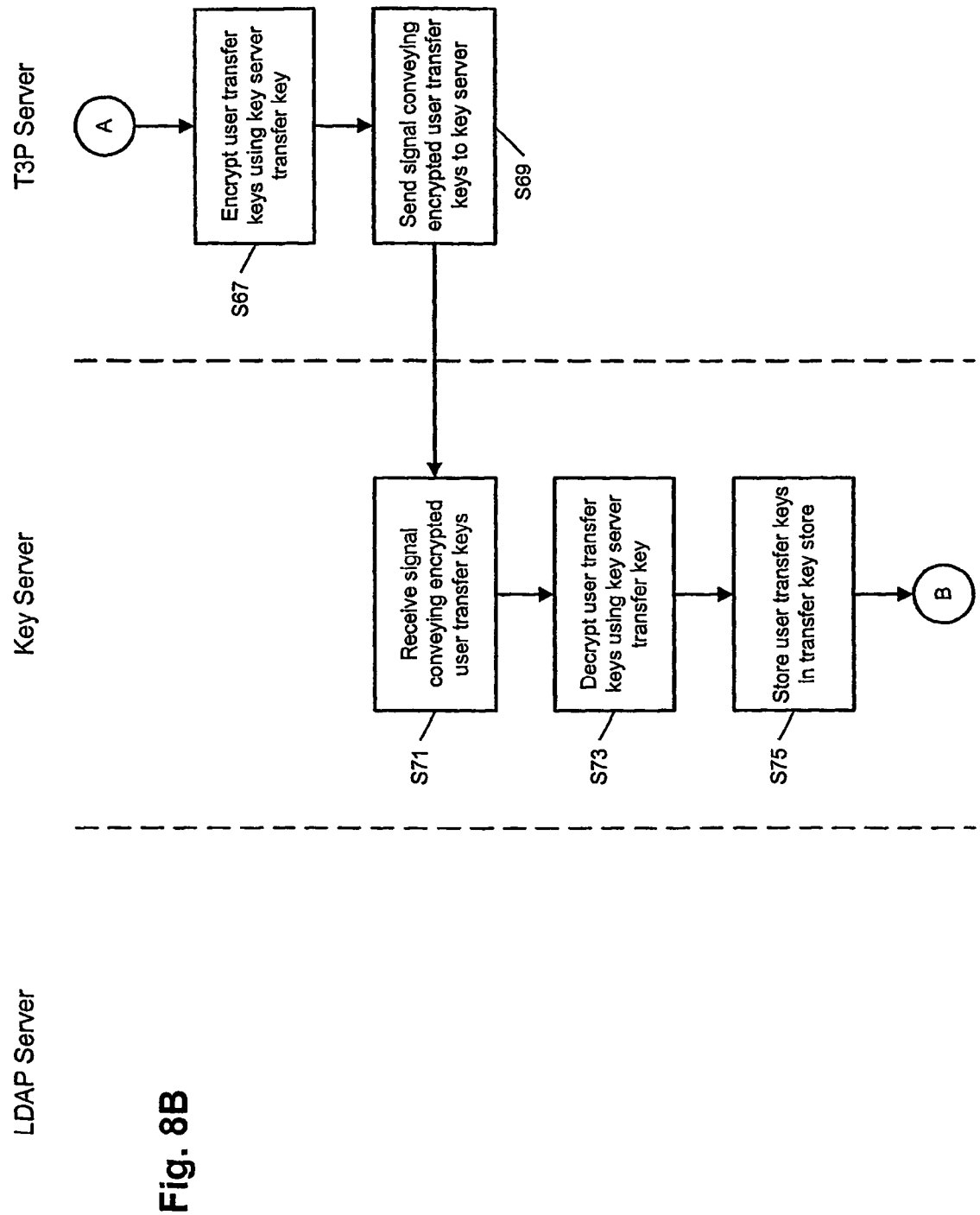
Figure 8C:
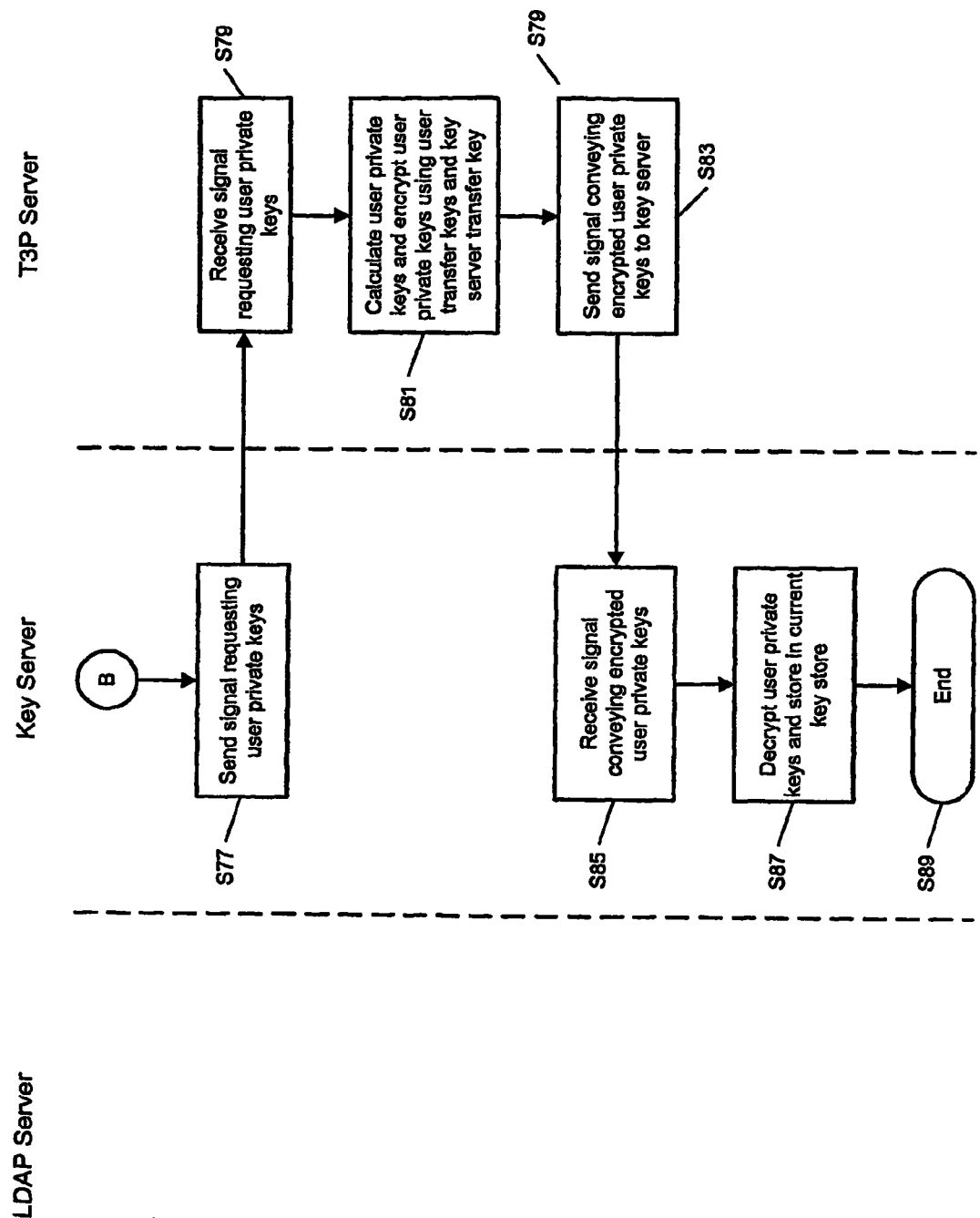

The key server 19 then executes, at S43, the Initiate_User_Keys sub-routine 97, which will now be described with reference to FIG. 8A to 8C.

After commencement, at S51, of the Initiate_User_Key sub-routine 97, the key server 19 sends, at S53, a signal to the LDAP server 17 requesting a list of all the user email addresses. In response to receipt, at S55, of the request signal, the Master_Control routine 141 of the LDAP server 17 initiates the Process_Request sub-routine 145. This sub-routine determines that the request is a request for the list of all user email addresses, interrogates the user database 147 to recover all the user email addresses, and then sends, at S57, a signal conveying the list of all the user email addresses to the key server 19.

After receiving, at S59, the signal conveying the list of user email addresses from the LDAP server 17, the key server 19 sends, at S61, an HTTPS-encoded signal to the T3P server 5 conveying a signed message requesting transfer keys for the users of the LAN 1 and including the list of the email addresses of the users of the LAN 1.

After receiving, at S63, the HTTPS signal requesting the transfer keys corresponding to the list of email addresses, the T3P server 5 generates, at S65, a random user transfer key for each user email address and stores the generated user transfer keys in the client database 211. The T3P server 5 then symmetrically encrypts, at S67, the user transfer key and associated email address pairs using key server transfer key, and then sends at S69 an HTTPS signal conveying the encrypted data to the key server 19.

On receiving, at S71, the signal from the T3P server 5, the key server 19 decrypts, at S73, the encrypted data to recover the user transfer keys and then stores, at S75, the user transfer keys in the transfer key store 109. The key server 19 then sends, at S77, an HTTPS-encoded signal to the T3P server 5 conveying a signed message requesting user private keys for the users of the LAN 1.

On receiving, at S79, the request for user private keys, the T3P server 5 uses the Calculate_Private_Key sub-routine 199 to calculate, at S81, a user private key for each email address in the list of email addresses. The T3P server 5 then symmetrically encrypts each generated user private key using the corresponding user transfer key for the user, and then further symmetrically encrypts the resultant encrypted user keys using the key server transfer key. The T3P server 5 then sends, at S83, an HTTPS-encoded signal conveying the encrypted user private keys to the key server 19.

After receiving, at S85, the HTTPS signal conveying the encrypted user private keys, the key server 19 decrypts, at S87, the user private keys using the key server transfer key and the user transfer key corresponding to each user in order to recover the user private keys, and stores the user private keys in the current key store 111 of the stored data memory region 89. The Initiate_User_Keys sub-routine 97 then ends at S89.

Returning to FIG. 7B, after execution of the Initiate_User_Keys sub-routine 97, the Enrol_Server sub-routine ends at S45.

New User

If after the initial installation the key server 19 receives, either as a network signal via the LAN or as an input to the operator interface 73, a request to register a new user, the key server 19 initiates the New_User sub-routine 99.

The New_User sub-routine sends a signed request to the T3P server 5 for a user transfer key for the new user. On receiving the request, the T3P server 5 generates and stores the new user transfer key, encrypts the new user transfer key using the key server transfer key and sends the encrypted new user transfer key to the key server 19. On receiving the encrypted new user transfer key, the key server 19 decrypts and stores the new user transfer key.

The key server 19 then sends a request for a private key for the new user to the T3P server 19, which calculates the new user private key using the Calculate_Private_Key sub-routine 199. The T3P server 5 then encrypts the new user private key using the new user transfer key and the key server transfer key, and sends the encrypted private key to the key server 19. On receiving the encrypted private key, the key server 19 decrypts the encrypted private key using the new user transfer key and the key server transfer key, and stores the recovered new user private key.

Root Key Management

It will be appreciated that the security of the user private keys is reliant on the root private key $K^G_{pri}$ remaining secret. As a precautionary measure, in this embodiment the root private key $K^G_{pri}$ is regularly changed, resulting also in a regular change of all the user private keys.

In particular, at predefined times as determined by the real time clock 177 of the T3P server 5, the Master_Control routine 193 of the T3P server 5 initiates the Update_Root_Keys sub-routine 199, which moves the then active root private key $K^G_{pri}$ and root public key $K^G_{pub}$ pair from the active root keys store 203 to the root key archive 207, moves a previously generated root private key $K^G_{pri}$ and root public key $K^G_{pub}$ pair from the future root keys store 205 to the active root keys store 203, and then generates a new root private key $K^G_{pri}$ and root public key $K^G_{pub}$ pair and stores the generated keys in the Future Root Keys Store 205. In this embodiment, the Update_Root_Keys sub-routine 199 is triggered on the first day of every month.

Storing the replaced active root public key $K^G_{pub}$/root private key $K^G_{pri}$ pair in the root key archive 207 allows the user keys generated from that key pair to be regenerated, so that an email encrypted during the period when those root keys were active can still be decrypted even if the recipient has lost the required user private key or the required user private key is otherwise unavailable.

As the active root keys are periodically updated, the key server 19 needs to download periodically new user private keys. In this embodiment, the Master_Control routine 93 of the key server 19 initiates at a random time between the tenth day and the twentieth day of the month, as determined by the real time clock 77 of the key server 19, the Download_Keys sub-routine 101 which determines the list of all user email addresses from the LDAP server 17, and then sends an HTTPS signal to the T3P server 5 conveying a signed message requesting new private keys for the list of email addresses. In response to receipt of the request, the Master_Control routine 193 of the T3P server 5 initiates the Supply_Root_Keys sub-routine 201 which in turn uses the Calculate_Private_Keys sub-routine 199 to calculate new user private keys corresponding to the list of email addresses using the root private key $K^G_{pri}$ stored in the Future Root Keys store 205. The generated user private keys are then symmetrically encrypted using the user transfer key corresponding to the associated email address, and the resultant encrypted transfer keys are then further symmetrically encrypted using the key server transfer key. The encrypted user private keys are then transmitted to the key server 19.

On receipt of the encrypted user private keys, the key server 19 decrypts the encrypted data using the key server transfer key and the user transfer keys to recover the user private keys, and then stores the recovered private keys in the Future Key Store 113.

Subsequently, at the same time as the T3P server 5 triggers the Update_Root_Keys sub-routine 201, the Master_Control routine 93 of the key server 19 triggers the Update_Keys sub-routine 103 which transfers the existing user keys in the Current User Key Store 111 into the Key Archive 115, and transfers the future user keys in the Future Key Store 113 into the Current User Key store 111.

By introducing a random timing element into when the key server 19 downloads replacement user private keys from the T3P server 5, different key servers obtain new user private keys at different times thereby evening out the processing load on the T3P server 5 over time.

Processing Incoming Emails

Figure 9B:
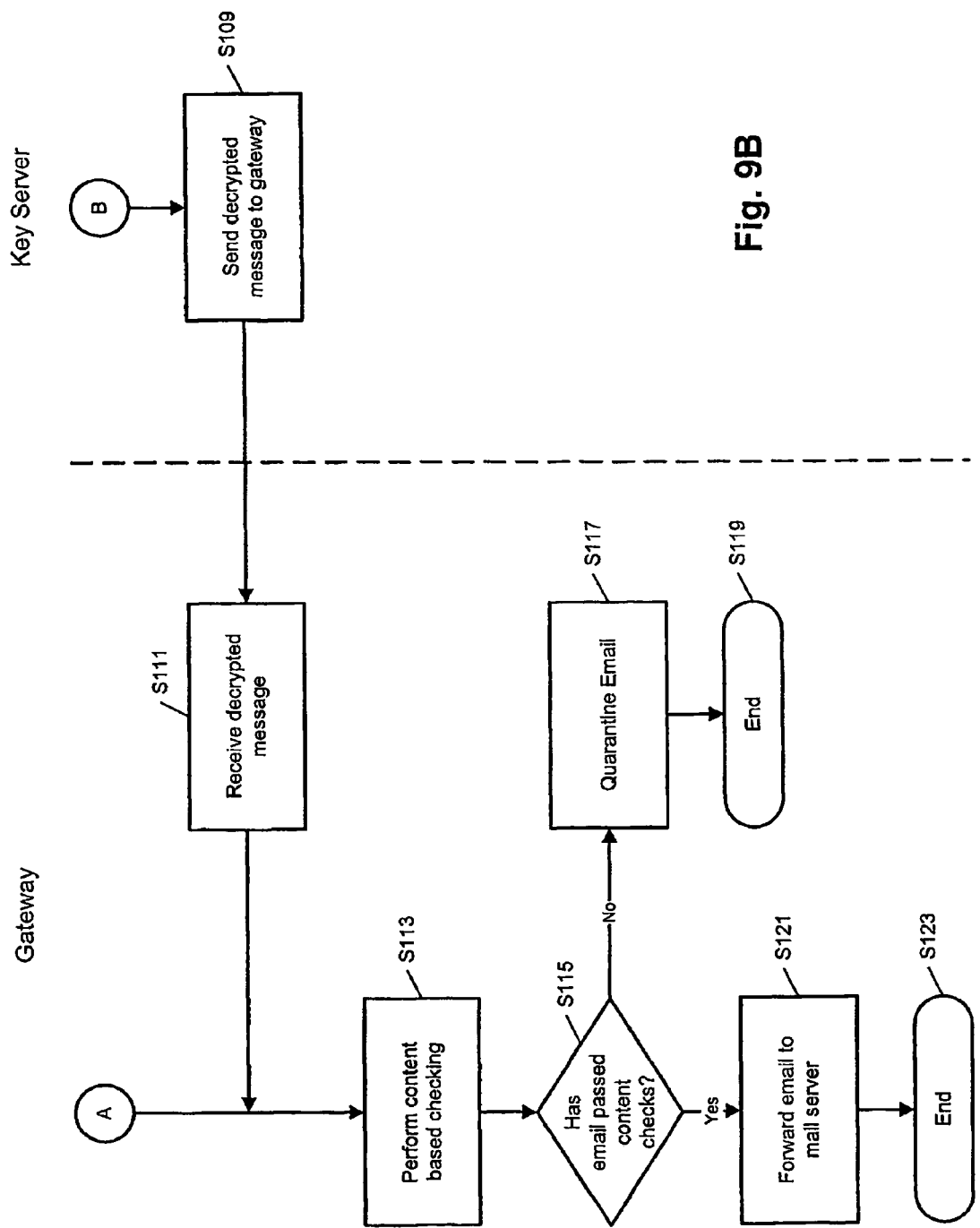

In response to the gateway 13 receiving an email inbound to the LAN 1, the Master_Control routine 55 triggers the Process_Incoming_Email sub-routine 57, which will now be described with reference to FIGS. 9A and 9B.

On initiation, at S91, of the Process_Incoming_Email sub-routine 57 in response to receipt of an incoming email, the gateway 13 performs, at S93, non-content based checks on the received email in accordance with rules specified in the criteria/rules store 61. These non-content based checks include checking that the sender of the email is not on a black list of senders, and/or checking that header information such as subject heading and the like does not match header information for known spam emails or virus-infected emails.

If the gateway 13 determines, at S95, that the received email does not pass one or more of the non-content based checks then the gateway 13 quarantines, at S97, the received email and the sub-routine ends at S99.

If the gateway 13 determines, at S95, that the received email passes the non-content based checks, the gateway 13 checks, at S101, if the email is encrypted. If the gateway 13 determines that the email is encrypted, then the gateway 13 sends, at S103, the email to the key server 19 for decryption. On receipt, at S105, of the encrypted email the Master_Control routine 93 of the key server 19 executes, at S107, the Decrypt_Message sub-routine 107.

The Decrypt_Message sub-routine 107 determines the recipient of the email and the time of sending of the email, and looks up the user private key for the recipient which was active at the time of sending the email. Usually, this will be the user private key for the recipient stored in the current user key store 111. However, it is possible that the user private key may have been updated since the time of sending of the email, in which case the user private key for the recipient which was active when the email was sent will need to be retrieved from the key archive 115. After retrieving up the correct user private key, the Decrypt_Message sub-routine 107 decrypts the message using the retrieved user private key. The key server 19 then sends, at S107, the decrypted message to the gateway 13.

If the gateway 13 determines that the received email is not encrypted, or after receipt of the decrypted message from the key server 19, the gateway 13 performs, at S113, content-based checks on the content of the message in accordance with rules stored in the criteria/rules store 61. In this embodiment, these checks include virus checks and heuristic checks for content which is indicative of spam emails.

If the gateway 13 determines, at S115, that the received email has failed one or more of the content-based checks, the gateway 13 quarantines, at S117, the email and the Process_Incoming_Email sub-routine 57 ends at S119. If the gateway 13 determines, at S115, that the received email has passed all the content-based checks, the gateway 13 forwards, at S121, the email to the mail server 15 to await access by the user, and the Process_Incoming_Email sub-routine 57 ends at S123.

Processing Outgoing Emails

In response to the gateway 13 receiving an email outgoing from the LAN 1, the Master_Control routine 55 triggers the Process_Outgoing_Email sub-routine 59, which will now be described with reference to FIG. 10.

After initiation, at S131, of the Process_Outgoing_Email sub-routine 59 the gateway 13 performs, at S133, checks on the outgoing email in accordance with rules stored in the criteria/rules store 61. In this embodiment, these checks include checks as to whether the email should be encrypted. For example, the criteria/rules store 61 includes rules that all emails from particular senders must be encrypted, or that all email to particular recipients must be encrypted. Further, the criteria/rules store 61 stores rules associated with heuristic analysis of the content of the outgoing email such that emails concerning certain subjects must be encrypted.

If the gateway 13 determines, at S135, that the email does not need to be encrypted then the gateway 13 passes, at S137, the email to the remainder of the Internet 7 in a conventional manner and the Process_Outgoing_Email sub-routine 59 ends at S139. If, however, the gateway 13 determines, at S137, that one or more of the checks indicate that the email should be encrypted, then the gateway 13 sends, at S141, the email to the key server 19 for encryption together with a request that the email be encrypted.

On receipt, at S143, of an email requiring encryption, the key server 19 executes, at S145, the Encrypt_Message sub-routine 105. First, the Encrypt_Message sub-routine 105 generates a random session key and symmetrically encrypts the message part of the email using the random session key to form the DEM-part of the encrypted email. The Encrypt_Message sub-routine 105 then calculates the user public key for the sender of the email and for each recipient of the email using the active root public key $K^G_{pub}$ and the email addresses for the sender and each recipient. The Encrypt_Message sub-routine 105 then asymmetrically encrypts the session key for the email using the calculated user public key for the sender, and then separately asymmetrically encrypts the session key using the calculated user public key for each recipient and combines all the encrypted session keys to form the KEM-part of the encrypted email. The key server 19 then sends, at S147, the encrypted email to the gateway 13.

On receipt, at S149, of the encrypted email the gateway 13 sends, at S151, the encrypted email to the Internet and the Process_Outgoing_Email sub-routine ends at S153.

Second Embodiment

In the first embodiment, as well as storing the user private keys the key server 19 performs any required encryption and decryption operations. This is advantageous because the user workstations do not require anything beyond a conventional email program. However, it may be desired to ensure that the encrypted version of the email is delivered to the user computer. For example, the user may be able to access mail messages stored in the mail server over the Internet, in which case it is preferable that encrypted emails are delivered to the user computer and the user computer performs the decryption.

A second embodiment will now be described with reference to FIGS. 11 to 14 in which an encryption plug-in is installed in the email program of each user computer allowing the user computer to perform cryptographic operations.

In the second embodiment, the T3P server is the same as the T3P server of the first embodiment apart from the addition of a New_User sub-routine, the key server is the same as the key server 19 of the first embodiment apart from a modification to the New_User sub-routine 99, and the gateway is the same as the gateway 13 of the first embodiment apart from a modification to the Process_Outgoing_Email sub-routine 59.

As shown in FIG. 11, in the second embodiment the user computer 221 has a network interface 223, an operator interface 225, a processor 227, a real time clock 229 and memory 231 which are interconnected by a bus system 233.

The network interface 223 receives data from and outputs data to the LAN 1 in the form of network signals 235. The operator interface 225 includes a keyboard (not shown in FIG. 11) for an operator to enter data into the user computer 221 and a display (not shown in FIG. 11) for allowing an operator to read data produced by the user computer 221. The operator interface 225 also includes a CD-ROM reader-writer via which data stored on a CD-ROM 237 can be input into the user computer 221 or data produced by the user computer 221 can be written onto a recordable CD-ROM 237.

The real time clock 229 provides time and date information which are used by the user computer 221.

The processor 227 performs processing operations in accordance with program routines stored in the memory 231. These program routines may be either stored during manufacture, or input to the user computer 221 via the operator interface 225 or the network interface 223. The program routines process data stored in the memory 231 and data received via the operator interface 225 or the network interface 223.

In the same manner as the memory 39 of the gateway 13 in the first embodiment, the memory 231 is formed by different types of memory having respectively different access times, and conventional processing techniques are employed to improve the speed of processing by caching data likely to be required into fast access time memory in advance.

The memory 231 includes a region 239, storing the program routines used by the user computer 221, a region 241 storing data and a region 243 providing working memory.

In particular, the programs stored in the program routines memory region 239 includes, among others:
an operating system 245;
a web browser 247; and
an email program 249 including an encryption plug-in 251.

The stored data memory region 241 stores, among other data:
user data 253 providing details of the user; and
encryption data 255 storing data which is used by the encryption plug-in 251.

Figure 12:
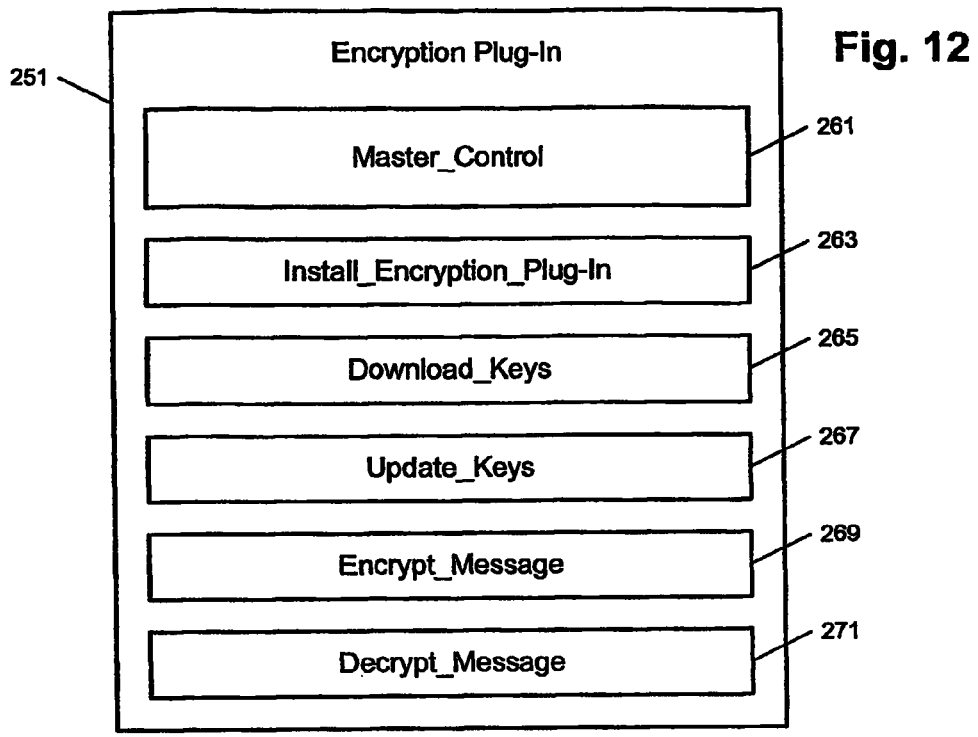
FIG. 12 schematically shows the main software routines associated with an encryption plug-in to an email program stored in the user computer illustrated in FIG. 11.

As shown in FIG. 12, the encryption plug-in 251 includes a number of routines, in particular:
a Master_Control routine 261;
an Install_Encryption_Plug-In sub-routine 263;
a Download_Keys sub-routine 265;
an Update_Keys sub-routine 267;
an Encrypt_Message sub-routine 269; and
a Decrypt_Message sub-routine 271.

Figure 13:
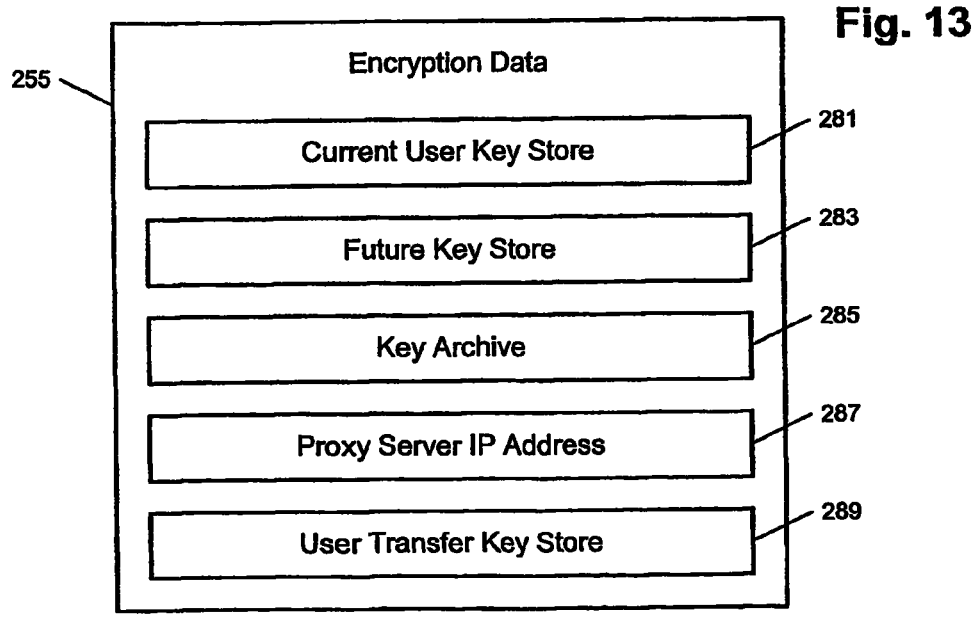
FIG. 13 schematically shows data associated with the encryption plug-in which is stored in the user computer illustrated in FIG. 11.
Figure 14B:
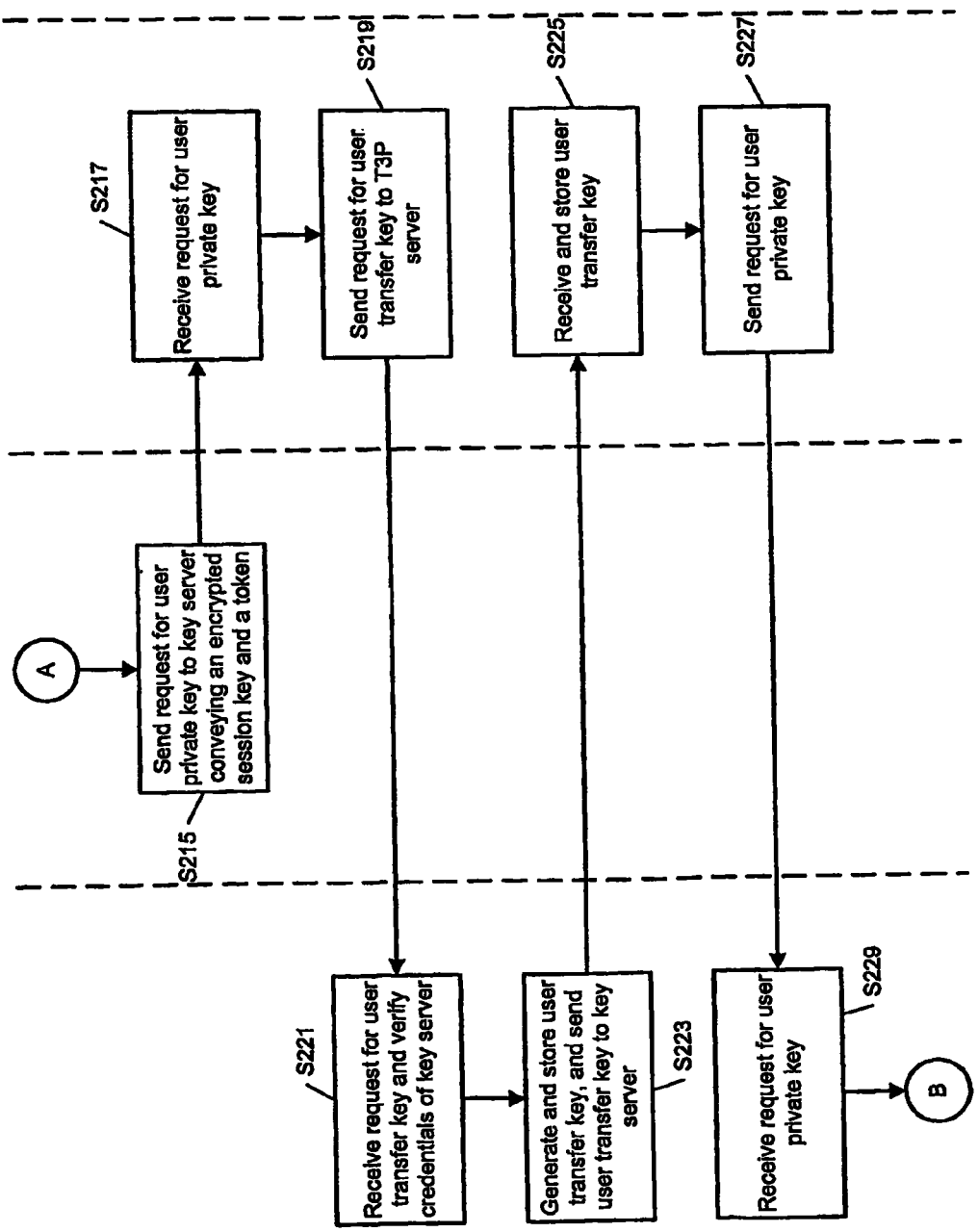
Figure 14D:
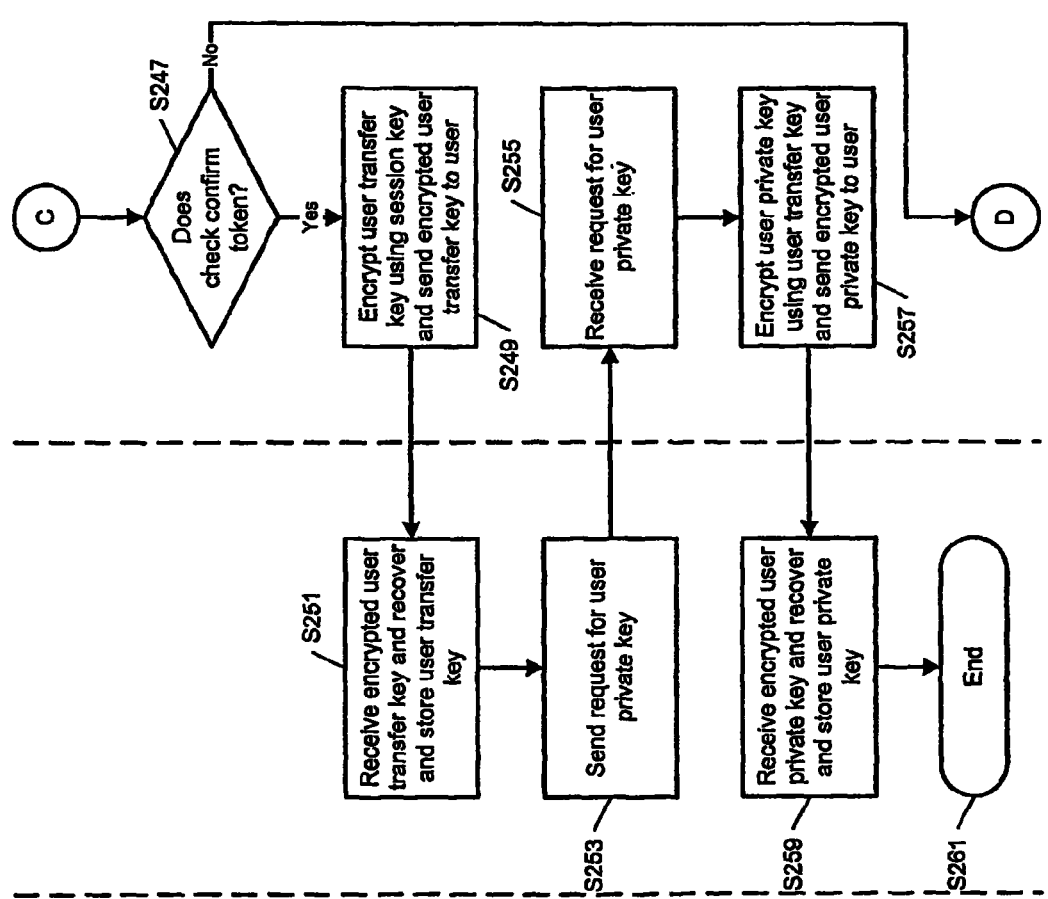
Figure 14E:
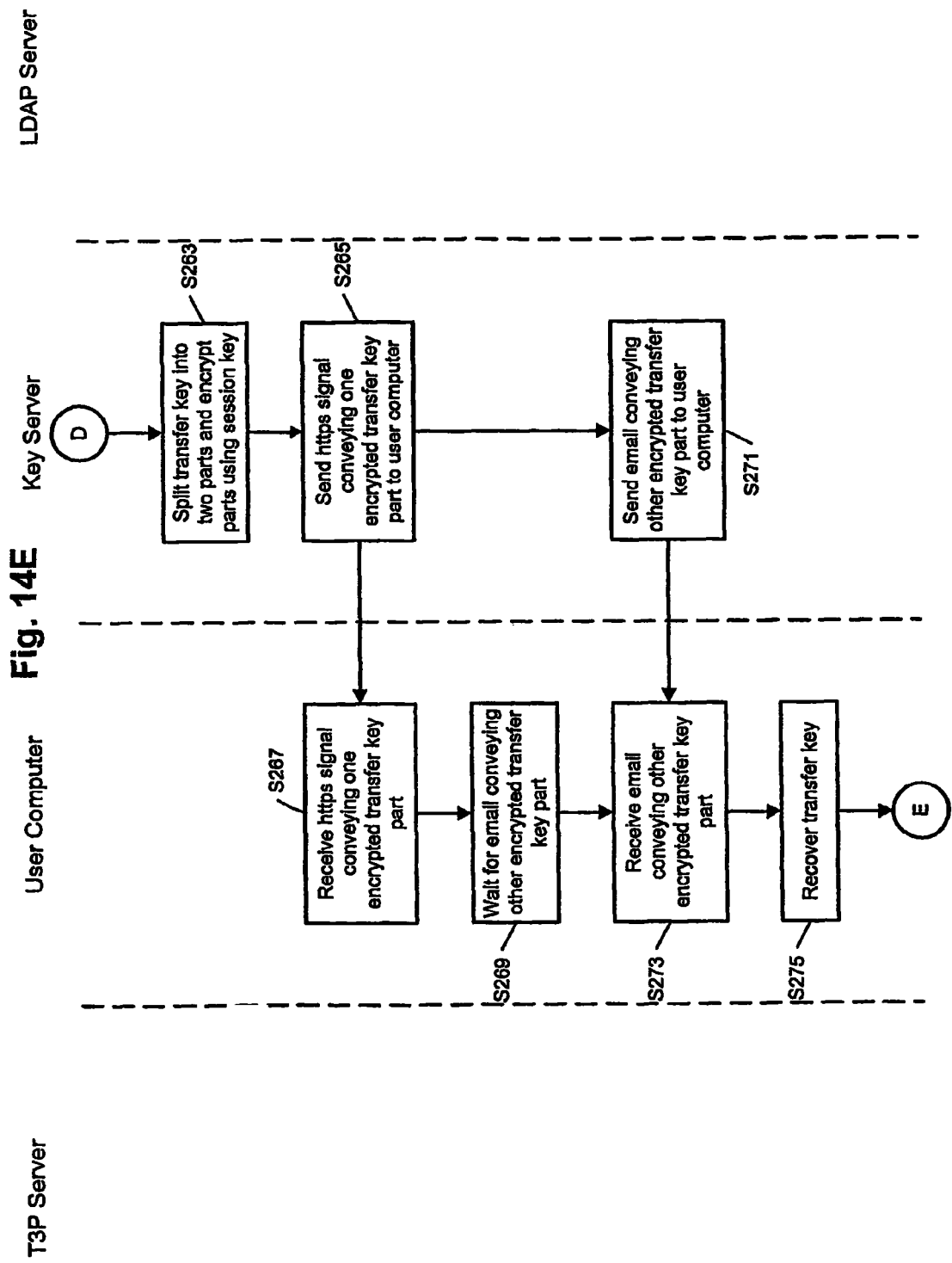

As shown in FIG. 13, the encryption data 255 includes:
a current user private key store 281;
a future key store 283;
a key archive 285;
a proxy server IP address store 287; and
a user transfer key store 289.

The main operations performed in the electronic mail messaging system of this embodiment will now be described.

Installation of Encryption Plug-In

The installation of the encryption plug-in 251 will now be described with reference to FIGS. 14A to 14F.

The installation process starts, at S201, with the operator of the user computer 221 activating the Install_Encryption_Plug-In sub-routine 263 using the operator interface 225. The user computer 221 then displays, at S203, a text entry box requesting entry of the email address for the user. The user computer then activates the web browser 247 and sends, at S205, a HTTP signal to the T3P server including the input email address and requesting a Uniform Resource Locator (URL) from which a user private key may be obtained.

On receipt, at S207, of the signal from the user computer 221, the T3P server initiates the New_User sub-routine which looks up, at S209, whether or not the email address corresponds to one of the ranges of email addresses for which a registered key server has authority to receive private keys. On finding that one of the key servers does have authority to receive the user private key for the email address, the T3P server sends, at S211, an HTTPS-encoded signal conveying a signed message including the URL for the key server, an electronic mail address for the key server, and the active root public key. If no registered key server has authority to receive a user private key for the user email address, then the T3P server sends the URL for the T3P server itself.

On receipt, at S213, of the signal from the T3P server, the user computer 221 stores the URL for the key server in the proxy server IP address store 287. The user computer 221 then calculates the public key for the key server using the received electronic mail address for the key server and the root public key $K^G_{pub}$. The user computer 221 then generates a random session key, asymmetrically encrypts the generated session key using the key server public key and sends, at S215, a HTTPS-encoded signal to the re-direct URL conveying a message requesting a user private key and including the encrypted session key data and a token providing user information.

On receiving, at S217, the request for the user private key, the key server decrypts the encrypted data using the private key for the key server to recover the session key. The key server then sends, at S219, a HTTPS-encoded signal to the T3P server conveying a signed message requesting a user transfer key for the user.

On receiving, at S221, the request from the key server for a user transfer key, the T3P server verifies the identity of the key server using the digital signature and also verifies that the key server has authority to receive the user private key corresponding to the user email address. After verifying the credentials of the key server, the T3P server generates, at S223, a random user transfer key, symmetrically encrypts the user transfer key using the key server transfer key, and then sends a signed message conveying the encrypted user transfer key to the key server.

On receiving (at S225) the encrypted user transfer key, the key server decrypts the encrypted data to recover the user transfer key and stores the user transfer key in the transfer key store. The key server then sends, at S227, an HTTPS signal to the T3P server conveying a signed message requesting the user private key.

After receiving, at S229, the request for a user private key, the T3P server calculates, at S231, the user private key using the active root private key $K^G_{pri}$. The T3P server then symmetrically encrypts the calculated user private key using the user transfer key and the key server transfer key, and then sends, at S233, the encrypted user private key to the key server.

On receiving, at S235, the encrypted user private key, the key server decrypts the encrypted data using the key server transfer key and the user transfer key to recover the user private key. The key server then sends, at S237, a request to the LDAP server to check the validity of the token. After receiving, at S239, the request to verify the token, the LDAP server initiates the Check_Token sub-routine 143 which checks, at S241, that the token is consistent with a user currently logged on to the LAN 1 who has the electronic mail address corresponding to the user private key, and sends, at S243, the result of the validity check to the key server.

On receiving, at S245, the result of the token validity check, the key server determines, at S247, whether or not the validity of the token has been confirmed by the LDAP server. If the validity of the token has been confirmed, then the key server symmetrically encrypts, at S249, the user transfer key using the session key and sends an HTTPS signal conveying the encrypted user transfer key to the user computer 221.

After receiving, at S251, the encrypted user transfer key, the user computer decrypts the encrypted data to recover the user transfer key and stores the recovered user transfer key in the current user transfer key store 289. The user computer then sends, at S253, a request for the user private key. On receiving, at S255, the request for the user private key, the key server symmetrically encrypts, at S257, the user private key using the user transfer key and sends the encrypted user private key to the user computer 221. After receiving, at S259, the encrypted user private key, the user computer 221 decrypts the encrypted data using the user transfer key to recover the user private key and stores the user private key in the current user private key store 251. The Install_Encryption_Plug-In sub-routine then ends at S261.

If the key server determines that the token has not been validated, for example because the LDAP server was for some reason offline, then the key server needs to ensure that operator of the user computer is in fact entitled to use the electronic mail address corresponding to the user private key. This is done by sending the user transfer key to the user in a similar manner to the way the T3P server sends the key server transfer key to the key server in the first embodiment.

In particular, the key server splits, at S263, the user transfer key into two parts and symmetrically encrypts each part using the session key. The key server then sends, at S265, an HTTPS signal conveying one encrypted transfer key part to the network address for the user computer 221. After receiving, at S267, the first encrypted transfer key part, the user computer 221 waits, at S269, for an email conveying the other encrypted transfer key part. Meanwhile, the key server sends, at S271, an email conveying the other encrypted transfer key part to the electronic mail address corresponding to the user private key.

On receiving, at S273, the email, the user computer decrypts, at S275, both sets of encrypted transfer key parts using the session key to recover the user transfer key.

The user computer 221 then sends, at S277, a signal to the key server requesting the user private key. On receiving, at S279, this request, the key server symmetrically encrypts the user private key using the user transfer key and sends, at S281, the encrypted data to the user computer 221. On receiving, at S283, the encrypted data the user computer 221 decrypts, at S285, the encrypted data to recover the user private key and then stores the user private key in the current user private key store 281. The Install_Encryption_Plug-In sub-routine then ends at S287.

Key Management

After installation, the user computer 221 downloads new user private keys from the key server using the Download_Keys sub-routine 265, and updates the active keys using the Update_Keys sub-routine 267. In particular, the Download_Keys sub-routine 265 is executed at a random timing, determined by the real time clock 229, intermediate the end of the period during which the key server downloads new user private keys and the timing when the key server updates the active keys, and the downloaded user private key is saved in the future key store 283. The Update_Keys sub-routine 267 is initiated at the same timing that the T3P server updates the root keys, and moves the current user private key from the current user key store 281 into the key archive 285 and moves the new user private key from the future key store to the current private key store.

Sending an Email

In this embodiment, the operator of the user computer has the option of deciding if an email is to be encrypted. In particular, the email program toolbar includes an option button which can be activated by the operator to make an email private.

If the operator selects to make an email private, the Encrypt_Message sub-routine 269 is activated, which calculates the user public key for each recipient from the email address of the recipient and the root public key $K^G_{pub}$, and generates an encrypted email using the KEM-DEM described previously. In particular, the encrypted email comprises a DEM-part conveying the message symmetrically encrypted using a random session key and a KEM-part conveying the a sequence of encrypted session keys corresponding to the session key asymmetrically encrypted using the user public key for the sender and each recipient.

In this embodiment, when an outgoing encrypted email is received by the gateway 13, the Process_Outgoing_Email sub-routine is modified to recognise and cache encrypted emails, and automatically pass a copy of the encrypted email to the key server for decryption. The key server is able to decrypt the encrypted email because the key server can recover the session key from the KEM-part using the user private key for the sender, and then decrypt the DEM-part using the recovered session key. The key server then sends the decrypted email to the gateway for content-based checks. If the email passes the content-based checks, then the cached encrypted email is passed to the internet, otherwise the cached encrypted email is quarantined.

Receiving an Email

In this embodiment, if an incoming email message is received by the gateway 13, the non content-based and content-based checks are performed in the same manner as the first embodiment. However, in this embodiment, a copy of the received encrypted email is cached by the gateway 13 and, if the encrypted email passes the content-based and non content-based checks, the cached encrypted email is passed to the mail server 15 for delivery to the user. On receiving an encrypted email, the user computer executes the Decrypt_Message sub-routine 271 which decrypts the received email using the user private key.

Modifications and other Embodiments

In the described embodiments, the T3P server generates a root private key and root public key pair. This generation involves some form of random number generation so that the generated keys are not predefined. Once the root private key is generated, the user private keys can be calculated from the root private key and some form of identifier for the user. Similarly, once the root public key is generated the user public keys can be calculated from the root public key and the identifier for the user. In particular, calculation of the user private and public keys does not require any random number generation and it is a repeatable calculation yielding the same result each time whenever and wherever it is performed.

In the described embodiments, the electronic mail address for the user is used as the identifier of the user. Other forms of identifier could be used, but the electronic mail address is convenient because the sender will always have knowledge of the electronic mail address for the recipient in order to send an electronic mail message to a recipient.

As described above, the sender can calculate the public key for a recipient using the electronic mail address for the recipient and the root public key.

Accordingly, there is no necessity to verify the authenticity of the public key for the recipient (for example by a public key certificate), although the root public key will normally form part of a public key certificate containing information for confirming the authenticity of the root public key in a conventional manner. It is worth noting that the sender can send an encrypted email to a recipient even if the recipient is not registered with the T3P server. If this occurs, the recipient simply needs to register with the T3P server to obtain a user private key which can be used to decrypt the encrypted message.

In the described embodiments, the asymmetric encryption algorithm discussed in WO 03/017559 is used. It will be appreciated that alternative algorithms with the same overall functionality could be used, for example the algorithm discussed in "ID based cryptosystems with pairing on elliptic curve" by R. Sakai and M. Kasahara, Cryptology ePrint archive, Report 2003/054 and the algorithm discussed in "An Efficient ID-KEM Based On the Sakai-Kasahara Key Construction" by Chen et al, Cryptology ePrint archive, Report 2005/224 (both of which publications are hereby incorporated herein by reference).

Further, the asymmetric encryption algorithm need not determine the public key for a client using the client identity, and any asymmetric encryption algorithm, for example the RSA algorithm, could be used.

In the described embodiments, emails are encrypted using the respective public key for each recipient so that each recipient can decrypt the email using the respective private key. In this way, only the desired recipients can decrypt the email. It will be appreciated that alternatively, or additionally, the email may be signed using the private key of the sender. In this way each recipient can verify that the email originated from the sender and has not been tampered with.

While in the described embodiments symmetric encryption is performed using the AES encryption algorithm, it will be appreciated that other symmetric encryption algorithms could be used, for example the DES algorithm.

In the first embodiment, the key server connected to a network acts as a cryptographic apparatus for a group of users connected to the local area network. In the second embodiment, the key server acts as a proxy server to facilitate the downloading to users of the local area network of information from the T3P server.

In both embodiments, the key server is used to monitor encrypted emails incoming to the LAN for email hygiene purposes, while in the second embodiment the key server is also used to monitor emails outgoing from the LAN for email hygiene purposes. While such operations are preferred, they are not essential.

In the described embodiments, when the key server requests new private keys for users of the network the key server first interrogates the LDAP server to get details of all the users of the network and then requests private keys for all the users of the networks. Alternatively, the key server could keep a record of the users requiring cryptographic services, and then only request new private keys for those users in order to reduce the processing load at the T3P server and the volume of network traffic. If subsequently a user requires cryptographic services for whom the key server did not have stored a user private key, the key server can simply send a request to the T3P server for the appropriate user private key.

In the first embodiment, the key server obtains details of the users of the LAN from a LDAP server. However, if the information is stored elsewhere on the LAN then the details of the users need not be obtained from the LDAP server.

In the second embodiment, a single key server is interposed between the users of a local area network and a T3P server operated by an encryption authority. Alternatively, a hierarchy of key servers could be interposed between the T3P server and the network users such that the T3P server supplies cryptographic keys to a group of first level key servers, each first level server supplies cryptographic keys to one or more second layer key servers and so on until the lowest layer key servers supply cryptographic keys to network users.

In the second embodiment, the key server only downloads cryptographic keys for a user of the LAN in response to a request from that user. Alternatively, the key server could automatically download cryptographic keys for all or some users of the LAN so that when a user request is received the key server is immediately able to supply the cryptographic keys.

In the described embodiments, the key server, the LDAP server, the gateway and the mail server are separate components connected to the LAN. Alternatively, the functions of two or more of these components could be integrated into a single device connected to the LAN.

Although in the described embodiments the key server is connected to a local area network and stands in for the T3P server for users of that local area network, this is not essential. For example, the network users could be users of a wide area network formed by two or more interconnected local area networks, which may well be the case for a large corporation having an internal computer network spread over a plurality of geographically separated sites.

In the described embodiments, the gateway performs non-content based checks on incoming and outgoing emails, and if an email passes the non-content based checks the gateway then performs content-based checks. In an alternative embodiment, the non-content based checks could specify that if a rule is complied with (for example if the recipient is a particular recipient), then the content-based checks can be bypassed.

In the illustrated embodiment, the trusted third party server 9 stores the root private keys and calculates the private client key using the client identity and the root private key. However, all that is necessary is that the trusted third party server 9 has access to the client private key. Accordingly, in alternative embodiments the trusted third party server 9 could directly store the private keys for each client, or alternatively access the desired private key for a client from a separate device.

In the described embodiments network signals are sent to network addresses for system components as http or https signals. It will be appreciated that these network addresses could be either static or dynamic. Further, it will be appreciated that network protocols other than http and https could be used.

In the described embodiments, the workstations and user computers are conventional personal computer. It will be appreciated that such personal computers may be, for example, of the laptop or desktop variety. Further, the user computer could be formed by other types of computer apparatus such as a thin client or a personal digital assistant (PDA).

Although the described embodiment of the invention comprises computer apparatus and processes performed in the computer apparatus, the invention also extends to computer programs, particularly computer programs on or in a carrier, adapted for putting the invention into practice. The program may be in the form of source code, object code, a code intermediate source and object codes such as in a partially compiled form, or in any other form suitable for using the implementation of the processes according to the invention.

The carrier may be any entity or device capable of carrying the program. For example, the carrier may comprise a storage medium, such as a ROM, for example a CD-ROM or a semiconductor ROM, or a magnetic recording medium, for example a floppy disk, or a hard disk. Further, the carrier may be a transmissible carrier such as an electronic or optical signal which may be conveyed via electrical or optical cable or by radio or other means.

When the program is embodied in a signal which may be conveyed directly by cable or other device or means, the carrier may be constituted by such cable or other device or means. Alternatively, the carrier may be an integrated circuit in which the program is embedded, the integrated circuit being adapted for performing, or for use in the performance of, the relevant processes.

Although in the described embodiments the invention is implemented using software, it will be appreciated that alternatively the invention could be implemented using hardware devices, or a combination of hardware devices and software.

The invention claimed is:

1. A network apparatus operable to communicate with one or more remote network devices which are associated with a group of users, the network apparatus comprising:
a request transmitter operable to transmit over a network to a remote server a request for cryptographic keys for the group of users;
a key receiver operable to receive cryptographic keys for the group of users and to store the received cryptographic keys in a cryptographic keys data store; and
a registration controller operable to control a registration procedure for registering the network apparatus with the remote server,
wherein the registration controller is operable to retrieve one or more transfer keys from the remote server and to store the transfer keys in a transfer key data store,
wherein the key receiver is operable, in response to receiving an encrypted cryptographic key, to retrieve at least one transfer key for decrypting the encrypted cryptographic key from the transfer key data store, and to decrypt the encrypted cryptographic key using the retrieved transfer key to recover the cryptographic key,
wherein the decryption using the transfer key employs a symmetric encryption algorithm,
wherein the registration controller is operable to retrieve a master transfer key associated with the network apparatus and plural user transfer keys, each user transfer key being associated with a different user within the group of users,
wherein the network apparatus has a network address and an associated electronic mail address,
wherein the registration controller is operable to receive i) a signal sent to the network address for the network apparatus conveying a first part of the master transfer key, and ii) an electronic mail message sent to the associated electronic mail address for the network apparatus conveying a second part of the master transfer key, and the registration controller is further operable to recover the master transfer key using said first and second parts.

2. A network apparatus according to claim 1, wherein subsequent to the retrieval of the master transfer key, the registration controller is operable to receive encrypted user transfer keys, to decrypt the encrypted user transfer keys using the master transfer key to recover the user transfer keys, and to store the recovered user transfer keys in the transfer key data store.

3. A network apparatus according to claim 2, wherein the encrypted user transfer keys are received by the network apparatus in the form of a network signal sent to the network address for the network apparatus.

4. A network apparatus according to claim 3, wherein subsequent to the retrieval of the user transfer keys, the registration controller is further operable i) to receive encrypted cryptographic keys, each encrypted cryptographic key being associated with a respective one user of the group of users, ii) to decrypt each encrypted cryptographic keys using the user transfer key for the associated one user of the group of users to recover the cryptographic keys, and iii) to store the recovered cryptographic keys in the cryptographic keys data store.

5. A network apparatus according to claim 4, wherein the registration controller is operable to obtain identification information for the group of users from a lightweight directory access protocol server associated with said one or more remote network devices, and
wherein in response to receiving the identification information for the group of users from the lightweight directory access protocol server, the registration controller is operable to forward said identification information to the remote server.

6. A network apparatus according to claim 5, wherein the identification information comprises electronic mail address information.

7. A network apparatus according to claim 1, wherein the network apparatus further comprises:
a key request processor operable, in response to a request from one user of the group of users for a cryptographic key associated with said one user of the group of users, to retrieve one or more cryptographic keys associated with said one user of the group of users from the data store and to transmit the one or more retrieved cryptographic keys to said one user of the group of users.

8. A network apparatus according to claim 7, wherein the request processor is operable to encrypt the cryptographic key associated with said one user of the group of users using a user transfer key associated with said one user of the group of users.

9. A network apparatus according to claim 1, wherein the network apparatus further comprises:
a decryption controller operable to control decryption of a received encrypted electronic mail message.

10. A network apparatus according to claim 9, wherein the received encrypted electronic mail message is addressed to the electronic mail address for one user of the group of users, and
wherein the decryption controller is operable to retrieve a cryptographic key associated with said addressed user and to decrypt the encrypted electronic mail message using the retrieved cryptographic key.

11. A network apparatus according to claim 9, wherein the received encrypted electronic mail message is sent from the electronic mail address for one user of the group of users, and
wherein the decryption controller is operable to retrieve a cryptographic key associated with said electronic mail address for the sender and to decrypt the encrypted electronic mail message using the retrieved cryptographic key.

12. A network apparatus according to claim 1, wherein the network apparatus further comprises:
an encryption controller operable to control encryption of a received electronic mail message sent by one user of the group of users to one or more addresses.

13. A network apparatus according to claim 12, wherein the encryption controller is operable to calculate a cryptographic key for an addressee of the received electronic mail message using the electronic mail address for the addressee.

14. A local area network comprising a network apparatus according to claim 1, wherein the transmitter of the network apparatus is operable to transmit a request for cryptographic keys to a remote server external to the local area network.

15. A network apparatus operable to communicate with one or more remote network devices which are associated with a group of users, the network apparatus comprising:
   a request transmitter operable to transmit over a network to a remote server a request for cryptographic keys for the group of users;
   a key receiver operable to receive cryptographic keys for the group of users and to store the received cryptographic keys in a cryptographic keys data store; and
   a user registration controller operable to control a registration procedure to add a new user to the group of users,
   wherein the network apparatus comprises a transfer key data store, and wherein the user registration controller is operable to retrieve a user transfer key from the remote server, to store the user transfer key in a transfer key data store, and to forward the retrieved user transfer key to said new user,
   wherein the user registration controller initiates registration of the new user in response to signal from a user network address conveying a new user request including an electronic mail address for the new user and a token identifying the new user,
   wherein the request processor is operable to request verification of the token from a lightweight directory access protocol server,
   wherein in response to verification of the token by the lightweight directory access protocol server, the request processor is operable to transmit a signal to said user network address conveying the user transfer key for the new user, and
   wherein in the absence of verification of the token by the lightweight directory access protocol server, the request processor is operable to split the user transfer key for the new user into two or more parts and to send a signal to the user network address conveying a first part of the user transfer key for the new user and to transmit an electronic message to the electronic mail address for the new user conveying a second part of the user transfer key for the new user.

* * * * *